(12) United States Patent
Kuninobu et al.

(10) Patent No.: US 11,590,970 B2
(45) Date of Patent: Feb. 28, 2023

(54) DEADLOCK DETECTION DEVICE, INFORMATION PROCESSING DEVICE, DEADLOCK DETECTION METHOD, AND NON-TRANSITORY COMPUTER READABLE MEDIUM

(71) Applicant: KABUSHIKI KAISHA TOSHIBA, Minato-ku (JP)

(72) Inventors: Shigeta Kuninobu, Yokohama (JP); Hideyuki Aisu, Kawasaki (JP); Tomoshi Otsuki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 44 days.

(21) Appl. No.: 16/567,679

(22) Filed: Sep. 11, 2019

(65) Prior Publication Data
US 2020/0139964 A1 May 7, 2020

(30) Foreign Application Priority Data
Nov. 6, 2018 (JP) .............................. JP2018-209015

(51) Int. Cl.
*B60W 30/095* (2012.01)
*B60W 30/18* (2012.01)
(Continued)

(52) U.S. Cl.
CPC ............ *B60W 30/0956* (2013.01); *B60W 30/18154* (2013.01); *G05D 1/0027* (2013.01);
(Continued)

(58) Field of Classification Search
CPC ............... G05D 1/0027; G05D 1/0212; G05D 1/0214; G05D 1/0274; G05D 1/0287;
(Continued)

(56) References Cited

U.S. PATENT DOCUMENTS 5,038,290 A    8/1991  Minami
5,283,739 A *  2/1994  Summerville ....... G05D 1/0289
                                                180/168

(Continued)

FOREIGN PATENT DOCUMENTS

JP           2-77808 A      3/1990
JP           7-19177 B2     3/1995
(Continued)

*Primary Examiner* — Aaron L Troost
(74) *Attorney, Agent, or Firm* — Oblon, McClelland, Maier & Neustadt, L.L.P.

(57) ABSTRACT

According to one embodiment, a deadlock detection device includes a combining calculator and a deadlock determiner. The combining calculator performs selecting a mobile vehicle or combined mobile vehicles from among mobile vehicles, based on a traveling path configuration graph and first state information, going forward the selected mobile vehicle to go forward on traveling path configuration graph and combining the selected mobile vehicle to another mobile vehicle or another combined mobile vehicles at a back of the other mobile vehicle or the other combined mobile vehicles, iterating a process of the selecting, the going and combining. The deadlock determiner determines that a deadlock occurs if not all the mobile vehicles have been combined by the combining calculator, and determines that no deadlock occurs if all the mobile vehicles have been combined.

13 Claims, 18 Drawing Sheets

(51) Int. Cl.
*G05D 1/02* (2020.01)
*G05D 1/00* (2006.01)
(52) U.S. Cl.
CPC ......... *G05D 1/0293* (2013.01); *G05D 1/0297* (2013.01); *G05D 2201/0216* (2013.01)
(58) Field of Classification Search
CPC .. G05D 1/0289; G05D 1/0293; G05D 1/0297; G05D 1/0088; G05D 2201/0216; G05D 1/00–12; H04L 67/12; B60W 30/09; B60W 30/0956; B60W 30/18154; G01C 21/3453; G06Q 10/08; G08G 1/16; G08G 1/166; G08G 9/00; G08G 9/02
See application file for complete search history.

(56) References Cited

U.S. PATENT DOCUMENTS

| | | | |
|---|---|---|---|
| 5,625,559 A * | 4/1997 | Egawa | G05D 1/0255 701/117 |
| 10,140,859 B1 * | 11/2018 | Greenberger | G08G 1/096 |
| 2015/0227140 A1 * | 8/2015 | Douglas | G05D 1/0217 701/23 |
| 2017/0017236 A1 * | 1/2017 | Song | G08G 1/165 |
| 2018/0299882 A1 * | 10/2018 | Kichkaylo | G05B 19/418 |
| 2020/0042014 A1 * | 2/2020 | Martens | G08G 1/166 |
| 2020/0307924 A1 * | 10/2020 | Wieschemann | G08G 9/02 |
| 2020/0393849 A1 * | 12/2020 | Ishikawa | G05D 1/0214 |

FOREIGN PATENT DOCUMENTS

| | | |
|---|---|---|
| JP | 3952336 B2 | 8/2007 |
| WO | WO 02/23297 A1 | 3/2002 |

\* cited by examiner

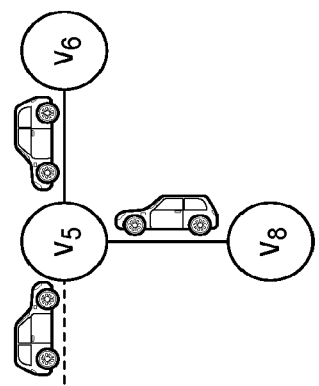
FIG. 4C
FIG. 4B
FIG. 4A

DEADLOCK DETECTION DEVICE, INFORMATION PROCESSING DEVICE, DEADLOCK DETECTION METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2018-209015, filed on Nov. 6, 2018, the entire contents of which are incorporated herein by reference.

FIELD

The present disclosure relate to a deadlock detection device, an information processing device, a deadlock detection method, and a non-transitory computer readable medium.

BACKGROUND

Conventionally, a method of creating a traveling plan of a mobile vehicle such as an automatic guided vehicle that conveys a package or the like in a warehouse, a factory or the like has been proposed. To calculate optimal traveling plan, simulation based a method that simulates future states (travel patterns of mobile vehicles) from current state (e.g., the positions and directions of the mobile vehicles on traveling paths) is often used. If it is allowed to take time more, more states to the distant future can be searched. Accordingly, a more optimal state can be found, and the optimal traveling plan can be created. However, if there are a large number of mobile vehicles and the traveling path configuration is complex, the number of states transitioned from a certain state becomes large. Consequently, it is impossible to search all the states in a realistically allowed time period.

As a method for resolving this problem, there is a method of providing an upper limit of a simulation time period or the number of times. However, according to this method, because a sufficient search process cannot be made, created traveling plans possibly cause a deadlock when operation instructions based on the traveling plans are issued for mobile vehicles. Here, the definition of deadlock is as follows: at least one mobile vehicle which cannot move to a certain crossing (an intersection) or an end point (a terminal point) exists.

As methods for preventing occurrence of the deadlock, there are known the following methods; a method of providing a rule for preventing occurrence of a deadlock, a method of providing blocked sections on traveling paths, and a method of setting traveling paths to be one way only,. However, these methods cannot create efficient (optimal) traveling plans in many cases.

Meanwhile, it is desired to create a traveling plan not causing a deadlock in the future as possible.

BRIEF DESCRIPTION OF THE DRAWINGS

FIGS. 4A, 4B and 4C show examples of obviously being in a deadlock;

FIG. 6B-1 and FIG. 6B-2 show specific examples of the number of mobile vehicles allowed to enter the tree structure part;

DETAILED DESCRIPTION

Figure 1:
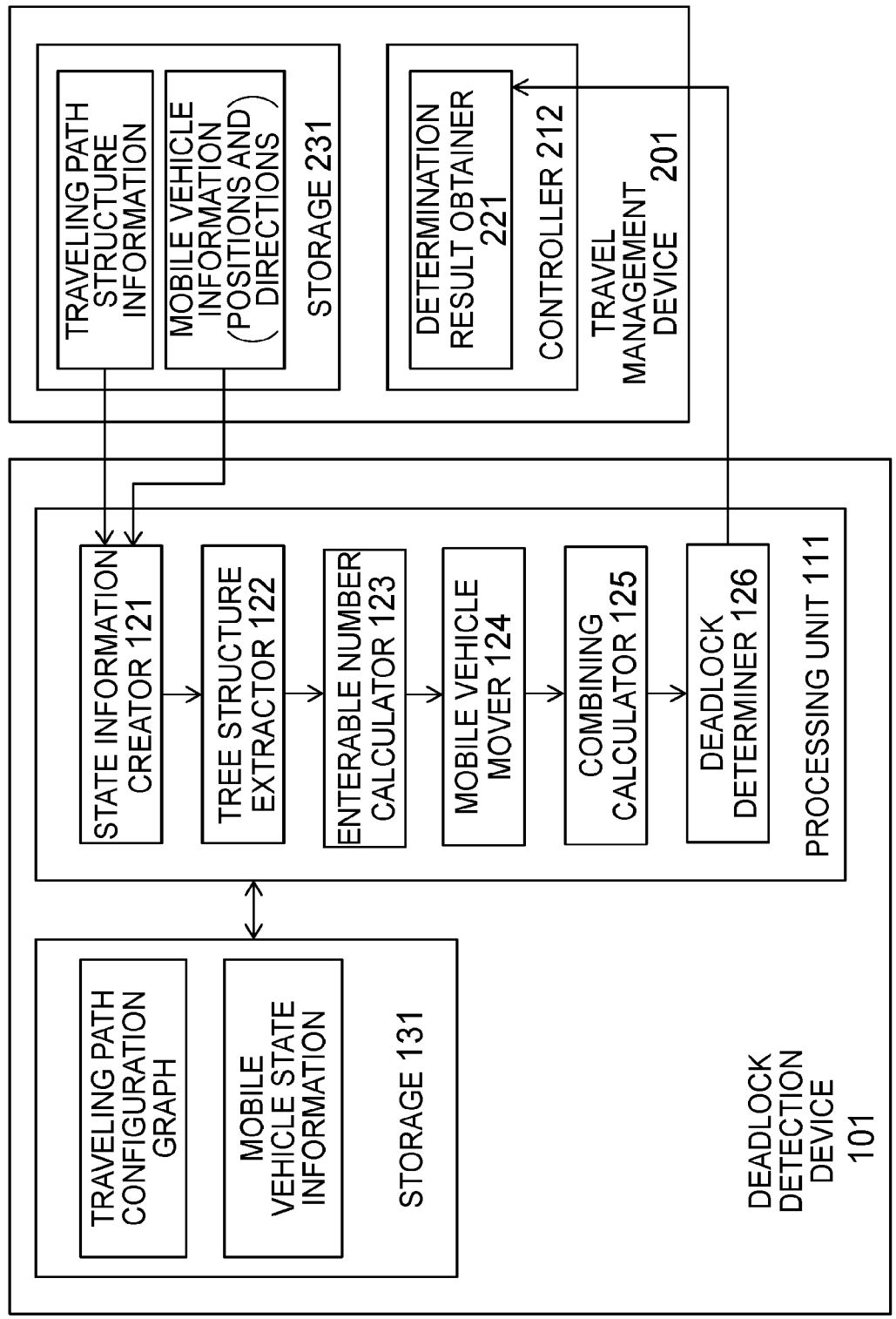
FIG. 1 is a block diagram of a travel management system that includes a deadlock detection device according to a first embodiment, and a travel management device.

According to one embodiment, a deadlock detection device includes a combining calculator and a deadlock determiner. The combining calculator performs selecting a mobile vehicle or combined mobile vehicles from among mobile vehicles, based on a traveling path configuration graph and first state information. The traveling path configuration graph includes a plurality of edges representing the traveling paths and a plurality of vertices representing intersections (or crossings) connecting the traveling paths and mobile vehicles are not allowed to pass each other in the traveling paths. The first state information indicates a state of mobile vehicles associated with the traveling path configuration graph, the state including positions and directions of the mobile vehicles.

The combining calculator performs going forward the selected mobile vehicle or the selected combined mobile vehicles to go forward on the traveling path configuration graph.

The combining calculator performs combining the selected mobile vehicle or the selected combined mobile vehicles to another mobile vehicle or another combined mobile vehicles at a back of the other mobile vehicle or the other combined mobile vehicles.

The combining calculator performs iterating a process of the selecting, the causing and the combining.

The deadlock determiner determines that a deadlock occurs if not all the mobile vehicles have been combined by the combining calculator, and determines that no deadlock occurs if all the mobile vehicles have been combined.

The deadlock is a state in which at least one mobile vehicle unable to go forward to any intersection exists.

Hereinafter, referring to the drawings, embodiments are described.

First Embodiment

FIG. 1 is a block diagram of a travel management system that includes a deadlock detection device 101 according to this embodiment, and a travel management device 201 controlling travelling of multiple mobile vehicles such as automatic guided vehicles. The deadlock detection device 101 and the travel management device 201 may be connected via wireless or wired network. Alternatively, the deadlock detection device 101 may be embedded in the travel management device 201.

The travel management device 201 controls multiple mobile vehicles that are movable in a traveling area, not shown. The speed of each mobile vehicle in the traveling area is controlled, and each mobile vehicle is stopped at any position; each mobile vehicle can thus be freely controlled. The travel of each mobile vehicle is controlled using wireless communication or wired communication. The traveling area includes traveling paths such as guided paths, intersections (crossings), and terminal points (warehouses and the like are arranged at the terminal points and the terminal points serve as dead ends). At each intersection, multiple traveling paths are connected to each other. The present embodiment assumes the following conditions for the traveling paths.

- It is assumed that when a mobile vehicle arrives at an intersection through a certain traveling path, the mobile vehicle is allowed to go forward to any other traveling path but is not allowed to go back to the traveling path through which the vehicle have arrived at the intersection.
- When a mobile vehicle arrives at a terminal point, the mobile vehicle having arrived at the terminal point is allowed to go back from the terminal point (i.e., the direction of the mobile vehicle is inverted at the terminal point).
- The traveling direction on each traveling path is not limited to unidirectional. Bidirectional travel is allowed.
- It is assumed that on the same traveling path, mobile vehicles are not allowed to pass by each other.
- It is assumed that all the traveling paths have length sufficient to allow all the mobile vehicles to enter. In the present embodiment, each traveling path have a length allowing seven mobile vehicles to be present in series at the same time.
- It is assumed that the mobile vehicles are allowed only to go forward and are not allowed to go backward. However, a case of allowing going both forward and backward is not excluded.
- It is assumed that the mobile vehicles only travel on the traveling paths and are not allowed to travel in regions other than the traveling paths.

The travel management device 201 creates an efficient traveling plan of each mobile vehicle in the traveling area. That is, the travel management device 201 creates a traveling plan that does not cause or hardly causes a deadlock that any mobile vehicle cannot move (travel) to some intersection and a terminal point of any traveling path in a short time. During traveling plan creation, the travel management device 201 uses the deadlock detection device 101 to determine whether the state of each mobile vehicle (the position and direction of each mobile vehicle) at a time point is a deadlock, and to identify a next state to which the current state is transitioned.

The travel management device 201 includes a controller 212, and a storage 231. The storage 231 stores structure information of the traveling area including the traveling paths, intersections, terminal points and the like (the information is below called traveling path structure information). Also, the storage 231 stores information on the positions and directions of the mobile vehicles that are present in the traveling area at a time point (the information is below called mobile vehicle information). The mobile vehicles are identified by respective identifiers, for example. The controller 212 controls the travel of the mobile vehicles in the traveling area, and performs simulation of the travel. The controller 212 includes a determination result obtainer 221. The controller 212 sends a request for determining whether a certain state is a deadlock during the simulation to the deadlock detection device 101. The determination result obtainer 221 then obtains the result of the determination. A configuration can be adopted that does not explicitly send the deadlock determination request to the deadlock detection device 101. The controller 212 may be implemented by a CPU, a dedicated circuit, or a circuit, such as of a processor. For example, the CPU executes a program, thereby achieving the function of the controller 212. The storage 231 is implemented by, for example, a storage medium, such as a memory, a hard disk or an SSD. The storage 231 may be connected externally to the travel management device 201, or be connected to the deadlock detection device 101 via a network.

The deadlock detection device 101 is an information processing device that includes a processing unit 111, and a storage 131. The processing unit 111 includes, for example, a CPU, a dedicated circuit, or a circuit, such as of a processor. For example, the CPU executes a program, thereby achieving the function of the processing unit 111.

The processing unit 111 includes a mobile vehicle state information creator 121 (which is below called state information creator 121), a tree structure extractor 122, an enterable number calculator 123, a mobile vehicle mover 124, a combining calculator 125, and a deadlock determiner 126.

The state information creator 121 receives the traveling path structure information, and the mobile vehicle information, from the storage 231 of the travel management device 201. The state information creator 121 creates a traveling path configuration graph on the basis of the received traveling path structure information. The state information creator 121 may receive the traveling path structure information and the mobile vehicle information at timing when the deadlock determination request is received from the travel management device 201, or voluntarily access the travel management device 201 and receive these pieces of information.

The traveling path configuration graph is a graph that includes a set of edges representing the traveling paths, a set of vertices representing the intersections or terminal points, and connection relationships therebetween. In this example, assuming that the set of vertices $V=\{v_1, \ldots, v_8\}$ and the set of edges $E=\{e_1, \ldots, e_9\}$, the traveling path configuration graph is represented as G={V, E}. The state information creator 121 stores the traveling path configuration graph in the storage 131.

The state information creator 121 identifies the position (the edge and the position on the edge) of each mobile vehicle and the direction of each mobile vehicle, on the basis of the traveling path structure information and the mobile vehicle information. The state information creator 121 creates the mobile vehicle state information (state information of mobile vehicles) that associates the positions of the mobile vehicles with the directions of the mobile vehicles in the traveling path configuration graph. The mobile vehicle state information collectively represents the states (the positions and directions) of the mobile vehicles at a time point, as a snapshot. The state information creator 121 stores the created mobile vehicle state information in the storage 131. The position of the mobile vehicle on the edge is not necessarily managed by the coordinates. When two or more mobile vehicles are present on the same edge, information indicating the relative positions of these mobile vehicles may be used. For example, when two mobile vehicles are present on a laterally extending traveling path, information indicating which mobile vehicle is on the left side and which mobile vehicle is on the right side may be used The storage 131 stores the traveling path configuration graph and the mobile vehicle state information created by the state information creator 121 therein. The storage 131 is implemented by, for example, a storage medium, such as a memory, a hard disk or an SSD. The storage 131 may be connected externally to the deadlock detection device 101, or be connected to the deadlock detection device 101 via a network.

Figure 2:
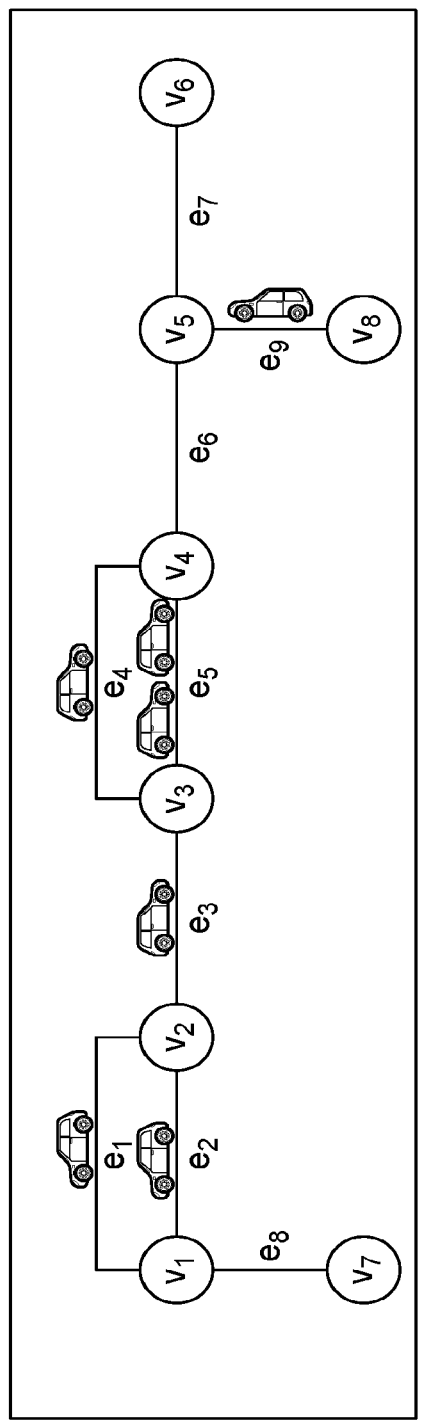
FIG. 2 shows an example of a traveling path configuration graph, and a state of mobile vehicles.

FIG. 2 shows an example of a traveling path configuration graph, and a state of mobile vehicles. The traveling path configuration graph includes nine traveling paths (edges) $e_1$ to $e_9$ and eight vertices $v_1$ to $v_8$. The vertices v1 to v8 correspond to the intersections and terminal points of the traveling paths. Specifically, $v_1$ to $v_5$ indicate the intersections, and $v_6$ to $v_8$ indicate the terminal points. One mobile vehicle is present on each of the edges $e_1$, $e_2$, $e_3$, $e_4$ and $e_9$. Two mobile vehicles are present on the edge $e_5$, which faces in the same direction.

When a mobile vehicle passes a certain vertex in a certain state of mobile vehicles (a target state of mobile vehicles), the target state of mobile vehicles is transitioned to next state of mobile vehicles.

Figure 3:
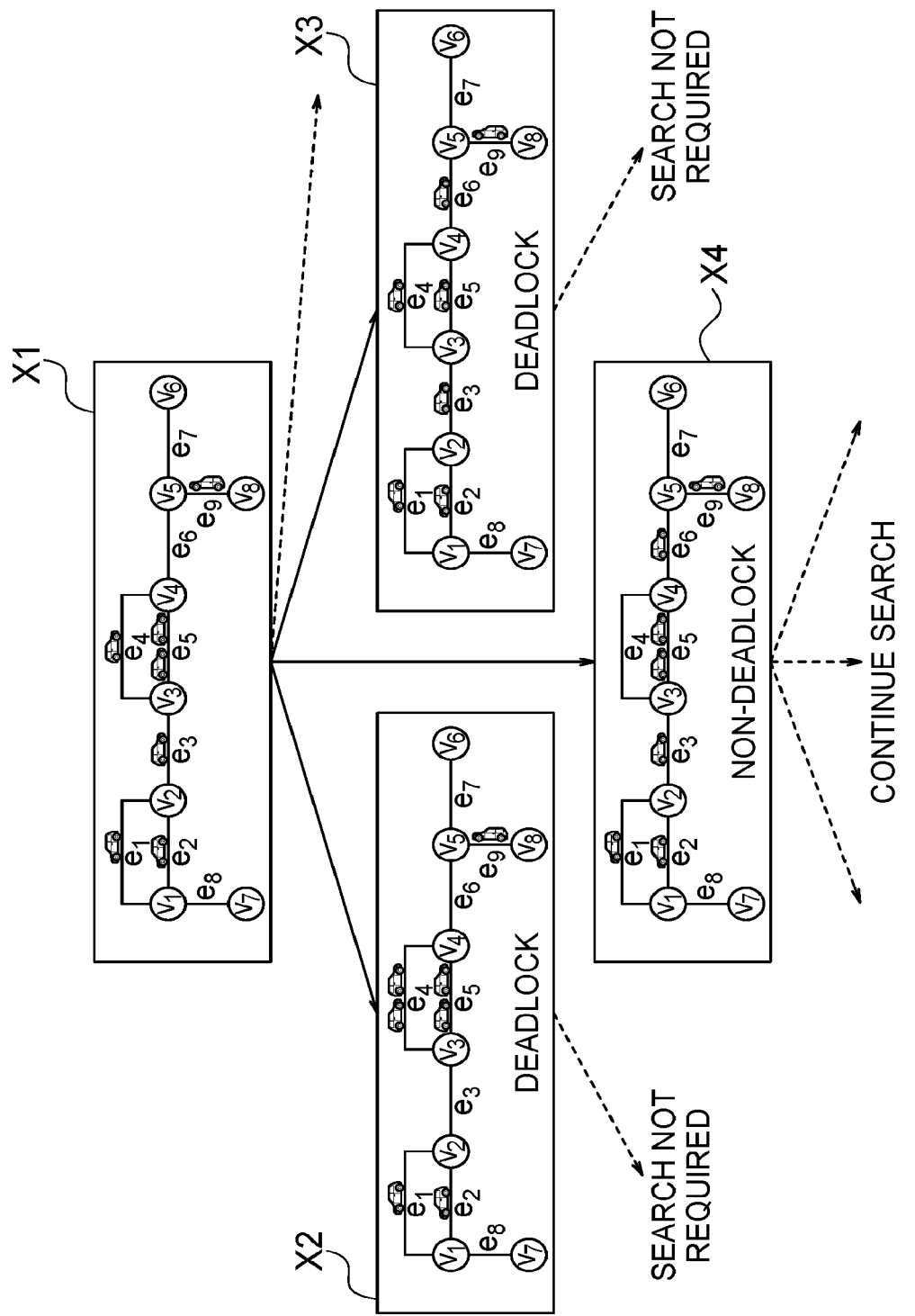
FIG. 3 shows an example of transition of the state of mobile vehicles.

FIG. 3 shows an example of transition of the state of mobile vehicles. A state X1 (target state of mobile vehicles) in FIG. 3 is the same as the state in FIG. 2. After the mobile vehicle on the edge $e_3$ in the state X1 passes the vertex $v_3$ and moves to the edge $e_4$, the state transitions to a state X2. After the mobile vehicle on the edge $e_5$ in the state X1 in FIG. 3 passes the vertex v6 and moves to the edge $e_6$, the state transitions to a state X3. After the mobile vehicle on the edge $e_4$ in the state X1 passes the vertex $v_4$ and moves to the edge $e_6$, the state transitions to a state X4. The states X2 and X3 are deadlocks, and the state X4 is not a deadlock. The description thereof is provided later.

Here, as to the deadlock, a certain state is obviously a deadlock in some cases. On the other hand, in other cases, and it is not obvious that a certain state is a deadlock; however, it becomes obvious that the certain state is a deadlock if the state transition advances. FIGS. 4A, 4B and 4C show an example of obviously being in a deadlock.

FIGS. 4A, 4B and 4C show examples of obviously being in a deadlock. FIG. 4A shows a case where mobile vehicles traveling in directions opposite to each other on the same edge are present. Neither of these mobile vehicles can go forward. Accordingly, this state is a deadlock. FIG. 4B shows a case where multiple mobile vehicles traveling in the same direction are present on the edge linked to the same terminal point $v_6$. If the mobile vehicle arriving at the terminal point $v_6$ first goes back, this vehicle faces the other mobile vehicle. Neither of the vehicles can advance any more. Accordingly, this state is a deadlock. FIG. 4C shows a case where mobile vehicles travel to the intersection $v_5$ from all the three edges linked to the intersection $v_5$. These mobile vehicles cannot change the directions in any manner at the intersection $v_5$. Accordingly, this state is a deadlock. The examples of deadlocks shown in FIGS. 4A, 4B and 4C are cases of obvious deadlock. Such a deadlock can be easily detected. A condition under which these deadlocks occur can be defined as a predetermined deadlock condition, thereby allowing a deadlock to be detected easily or rapidly in the case of obvious deadlock.

On the other hand, the states X2 and X3 in FIG. 3 described above do not the case of obvious deadlock as the deadlock described in FIGS. 4A, 4B and 4C. However, this embodiment can detect that these states are in a deadlock rapidly. In related arts, in order to detect that the state X2 in FIG. 3 is in a deadlock, all the states transitionable from state X2 are searched by exhaustive search (state branching). If all the states of the final branching destinations can be determined to be a deadlock, the state X2 is determined to be a deadlock. Accordingly, significant time is required for calculation. This also applies to the state X3. In contrast, in the present embodiment, such exhaustive search is not required for deadlock detection. The states X2 and X3 can be detected to be in a deadlock rapidly based on only the states X2 and X3 Consequently, a simulation time can be taken to search states transitionable from non-deadlock state such as the state X4, thereby allowing to find optimal operation of traveling.

The tree structure extractor 122 tests whether a tree structure is in the traveling path configuration graph stored in the storage 131. If a tree structure is present, the tree structure extractor 122 extracts tree structure part of the traveling path configuration graph. The tree structure part is a part where no loop is in the traveling path configuration graph.

Figure 5:
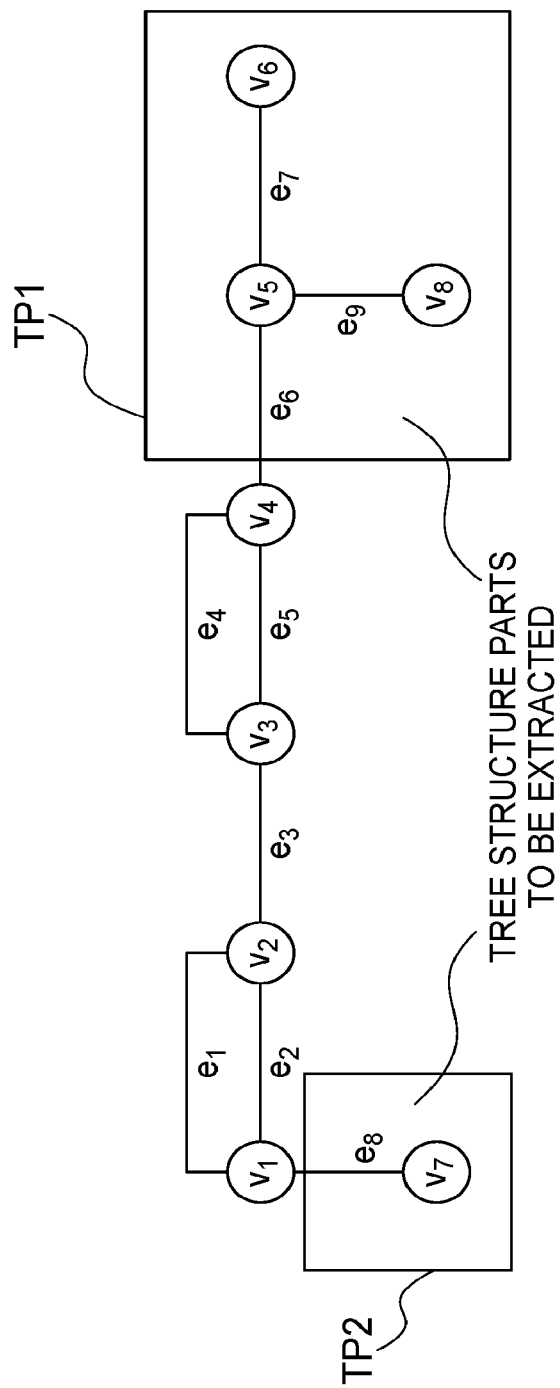
FIG. 5 shows tree structure parts in the traveling path configuration graph in FIG. 2.

FIG. 5 shows tree structure parts of the traveling path configuration graph in FIG. 2. There are two tree structure parts TP1 and TP2. The tree structure extractor 122 extracts the tree structure parts TP1 and TP2. The tree structure part TP1 includes the edges $e_6$, $e_7$ and $e_9$, and the vertices $v_5$, $v_6$ and $v_8$. The tree structure part TP2 includes the edge e8 and the vertex $v_7$.

The enterable number calculator 123 checks each of the extracted tree structure parts to detect whether a mobile vehicle incapable of going out of the tree structure part is present. If there is a mobile vehicle incapable of going out of the tree structure part, the tree structure part can be said to be in a deadlock. In this case, the enterable number calculator 123 notifies this deadlock to the deadlock determiner 126. The deadlock determiner 126 having received the notification determines that a deadlock occurs in the target state of mobile vehicles. In the other cases, that is, in the cases where all the mobile vehicles can go out of the tree structure part, no deadlock occurs in the tree structure part. However, it is still not obvious whether a deadlock occurs in view of the entire traveling path configuration including parts other than the tree structure parts in which deadlocks does occur (whether the deadlock occurs is determined through processes as be described later).

Figure 6A:
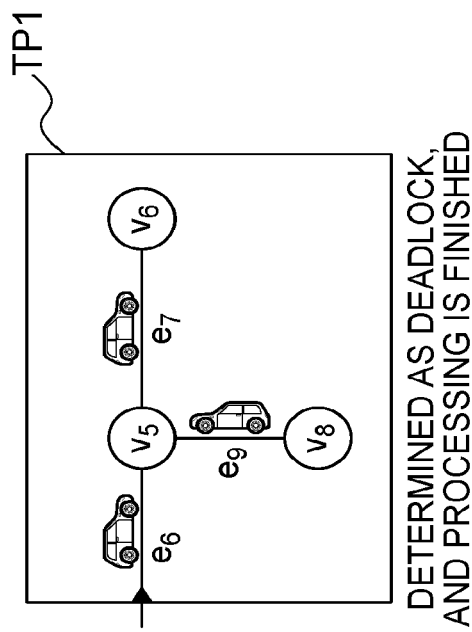
FIG. 6A shows an example where mobile vehicles incapable of going out of the tree structure part are present.

FIG. 6A shows an example where mobile vehicles incapable of going out of the tree structure part are present. If a mobile vehicle on the edge e6 enters the edge $e_7$, a mobile vehicle on the edge e9 can go out of the tree structure through the edge e6. However, the number of mobile vehicles on the edge $e_7$ becomes two. This state corresponds to the deadlock shown in FIG. 4B. That is, each of the two mobile vehicles cannot go out of the tree structure part.

If the enterable number calculator 123 determines that there is no mobile vehicle incapable of going out of the tree structure part, the enterable number calculator 123 calculates the number of mobile vehicles to be allowed to additionally enter the tree structure part. That is, the enterable number calculator 123 calculates the number of mobile vehicles that a deadlock does not occur even if the vehicles enter the tree structure part.

Figures 2, 6B:
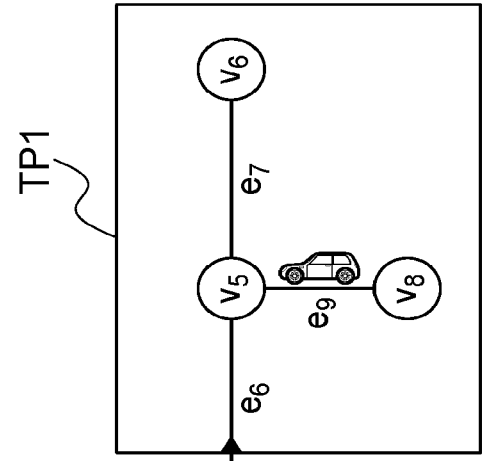
Figures 1, 6B:
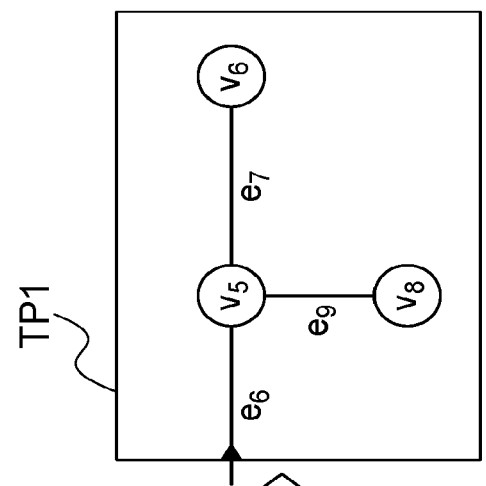

Referring to FIGS. 6B-1 and 6B-2, a specific example of calculating the number of mobile vehicles allowed to enter the tree structure part is described. In the example in FIG. 6B-1, no mobile vehicle is on any edge of the tree structure part, and two mobile vehicles are allowed to enter (i.e., even if two mobile vehicles enter, no deadlock occurs). In the example in FIG. 6B-2, one mobile vehicle is on the edge $e_9$, and one more mobile vehicle is allowed to enter (i.e., even if one more mobile vehicle enters, no deadlock occurs).

The detail of an algorithm according to which the enterable number calculator 123 determines whether a mobile vehicle incapable of going out of the tree structure part is present is described later. Also, the detail of an algorithm according to which the enterable number calculator 123 calculates the number of mobile vehicles allowed to enter the tree structure part is described later.

For each tree structure part, the mobile vehicle mover 124 moves the mobile vehicles as many as the number calculated by the enterable number calculator 123, from a main part of the traveling path structure (i.e., part other than the tree structure part in the traveling path structure) to the tree structure part. At this time, if it is possible to select a mobile vehicle(s) so that no mobile vehicle exists on the edge of the traveling path configuration graph, the mobile vehicle(s) on the edge is selected, and the selected mobile vehicle(s) is moved to the tree structure part.

Figure 7:
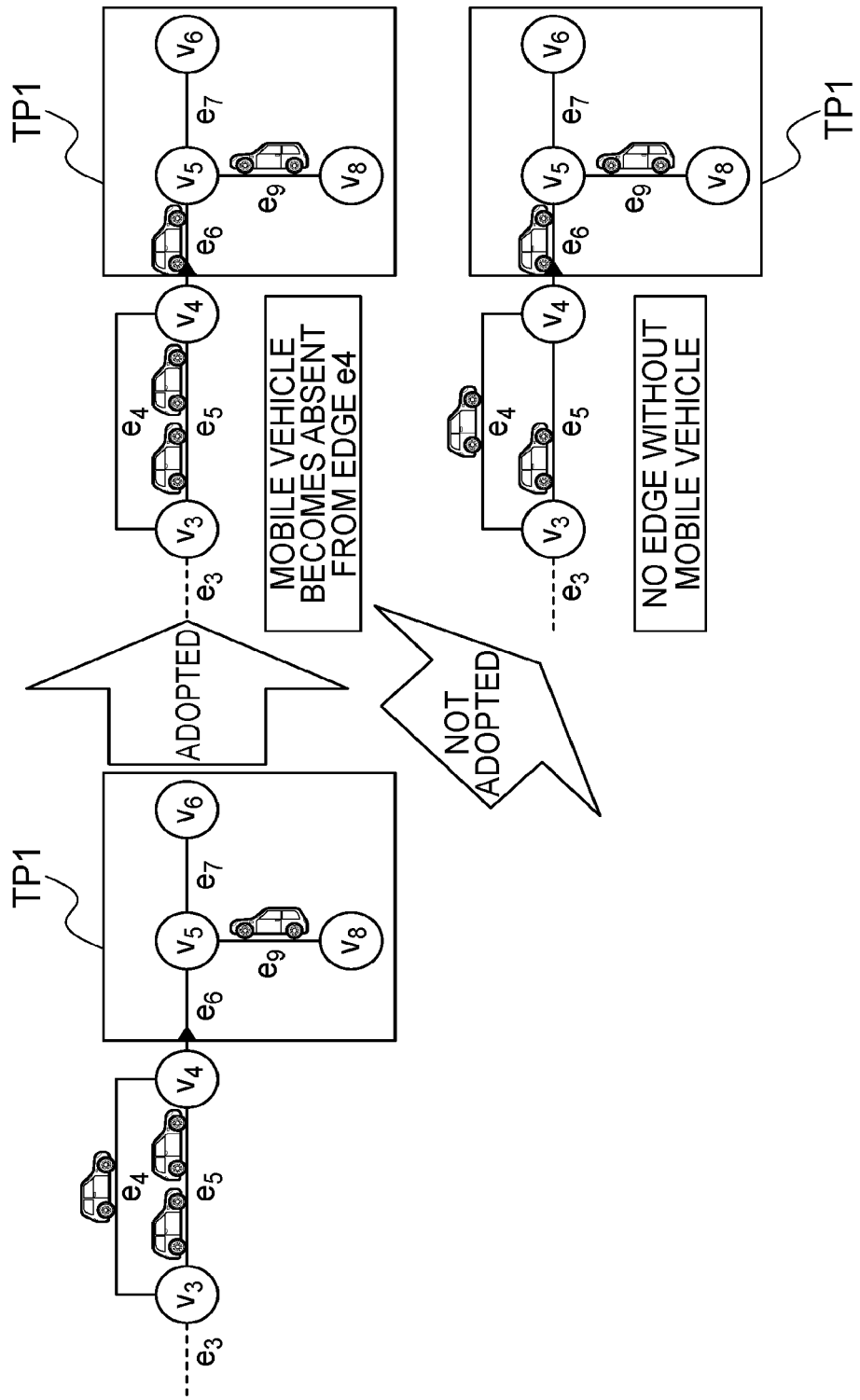
FIG. 7 shows a specific example of an operation of a mobile vehicle mover.

FIG. 7 shows a specific example of the operation of the mobile vehicle mover 124. The left partial illustration of the diagram shows the tree structure part TP1 in the traveling path configuration graph, and a graph part adjacent thereto. The state of mobile vehicles of the tree structure part TP1 is the same as that of FIG. 6B-2. One more mobile vehicle is allowed to enter the tree structure part TP1.

As shown in the upper right partial illustration of FIG. 7, one method (first method) of causing one mobile vehicle to enter the tree structure part TP1 is a method of moving the mobile vehicle on the edge $e_4$ to the edge $e_6$ via the vertex $v_4$. As shown in the lower right partial illustration of FIG. 7, another method (second method) is a method of moving a mobile vehicle existing near the tree structure part TP1 on the edge $e_5$ to the edge $e_6$.

According to the first method, no mobile vehicle exists from the edge $e_4$. According to the second method, there is no edge from which no mobile vehicle exists. Consequently, in this case, the mobile vehicle on the edge $e_4$ is moved to the edge $e_6$ of the tree structure part TP1. As long as the vehicle is movable into the tree structure part TP1, the movement destination edge is not necessarily the edge $e_6$. For example, the vehicle may be moved to the edge $e_7$.

If the state of mobile vehicles in the tree structure part TP1 is the state in FIG. 6B-1, two more mobile vehicles are allowed to enter the tree structure part. In this case, the two vehicles on the edge $e_5$ may be caused to enter the tree structure part, thus causing no mobile vehicle to exist from the edge $e_5$. Alternatively, one vehicle on the edge $e_5$ and one vehicle on the edge $e_4$ may be caused to enter the tree structure part, thus causing no mobile vehicle to exist from the edge $e_4$.

As described above, by moving the maximum number of mobile vehicles that do not cause a deadlock in the tree structure part from the part (main part) other than the tree structure part, it is accurately determined whether the state is a deadlock, on the basis only of the mobile vehicles that exist in the main part. Accordingly, in order to determine whether the state is a deadlock, the tree structure part is not required to be considered. The determination of whether the state is a deadlock can be performed simply or rapidly. By selecting the mobile vehicle to be moved from the edge of the main part such that no mobile vehicle exists from the edge, the accuracy of determination of whether the state is a deadlock can be improved. Note that in the present embodiment, even if there is the mobile vehicle movable from the main part to the tree structure part, the deadlock determination can be made without moving the mobile vehicle by executing processes thereafter.

After the mobile vehicle is moved to the tree structure part by the mobile vehicle mover 124, the combining calculator 125 performs a mobile vehicle combination process for the main part of the traveling path configuration graph. That is, each tree structure part which the mobile vehicle have been caused to enter is removed from the traveling path configuration graph, and then, the mobile vehicle combining process (which is described later) is performed based on the graph part (main part) after the removal and the mobile vehicles existing there.

The mobile vehicle combining process is described. In the mobile vehicle combining process, one mobile vehicle from among the mobile vehicles in the main part of the traveling path configuration graph is selected. The selected mobile vehicle is moved and combined with another mobile vehicle facing the same direction at the back of the other mobile vehicle in series. The mobile vehicles combined in series in the same direction on the one edge are dealt with as one mobile vehicle. For example, in a case where a mobile vehicle 1 is combined with a mobile vehicle 2 at the back of the mobile vehicle 2 in series, the combined mobile vehicles are defined as one mobile vehicle 1&2. Accordingly, the number of mobile vehicles that exist in the main part of the traveling path configuration graph is reduced by one. Then, the combined mobile vehicles or further another mobile vehicle is selected, and the selected mobile vehicle is moved and is combined with still another mobile vehicle at the back thereof in series in the same manner. Subsequently, the same process is iterated until the number of mobile vehicles becomes one or until mobile vehicles cannot be combined anymore. Here, the mobile vehicle combining is allowed only for mobile vehicles facing in the same direction. The mobile vehicles facing each other cannot be combined.

When the number of mobile vehicles is finally one as a result of the mobile vehicle combining process by the combining calculator 125, the deadlock determiner 126 determines that the target state of mobile vehicles is not in a deadlock. That is, the deadlock determiner 126 determines that the state of mobile vehicles identified from the information (the traveling path structure information and mobile vehicle state information) received from the travel management device 201 is not a deadlock. This is ensured because the order of the vertexes in the main part is two or more. On the contrary, when the number of mobile vehicles is two or more as a result of the mobile vehicle combining process, the deadlock determiner 126 determines that the target state of mobile vehicles is a deadlock.

Hereinafter, the mobile vehicle combining process performed by the combining calculator 125 is described in more detail.

Figure 8:
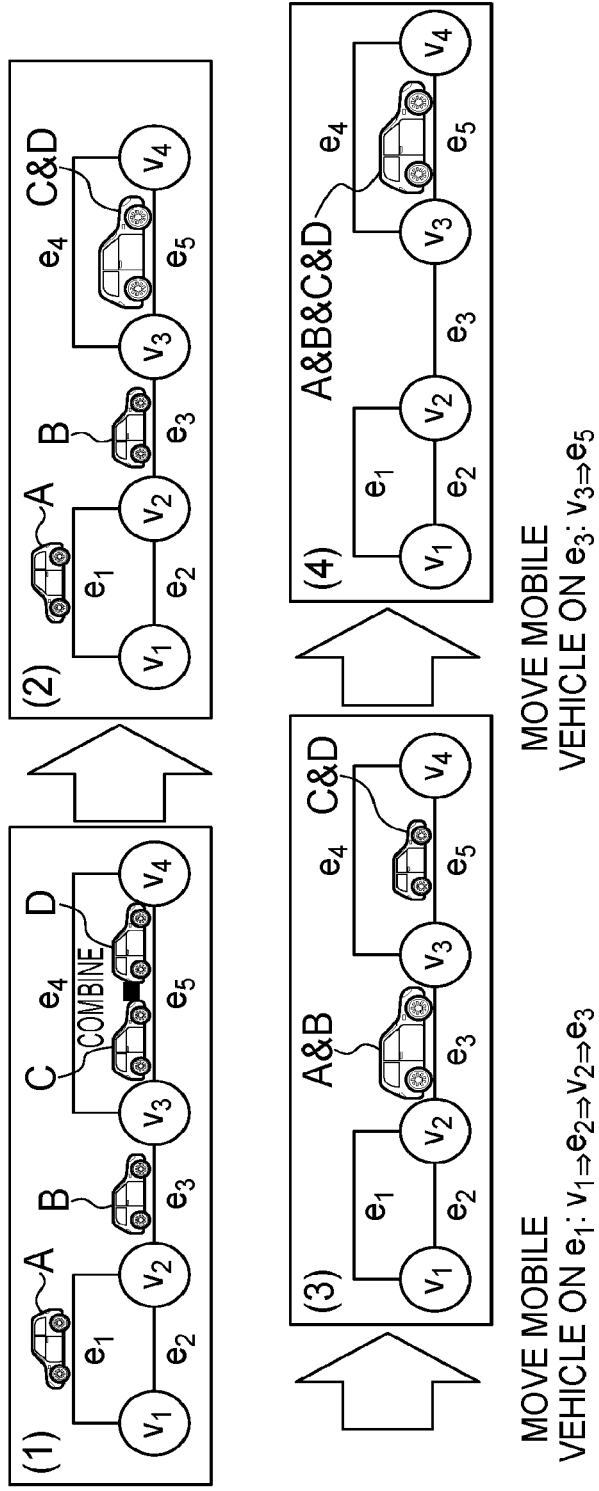
FIG. 8 shows a specific example of a process of combining mobile vehicles in a mobile vehicle combining process.

FIG. 8 shows a specific example of an operation of combining the mobile vehicles in the mobile vehicle combining process. FIG. 8(1) shows the main part of the traveling path configuration graph, and mobile vehicles in the main part. For the sake of convenience, the mobile vehicles are assigned A to D reference symbols. In FIG. 8(1), two mobile vehicles C and D facing in the same direction are on the edge $e_5$. The left mobile vehicle C is selected, and the selected mobile vehicle C is combined with the right mobile vehicle D at the back in series to form one mobile vehicle C&D (FIG. 8(2)). Next, a mobile vehicle A on the edge $e_1$ in FIG. 8(2) is selected. The mobile vehicle A on the edge $e_1$ is moved such that $v_1 \to e_2 \to v_2 \to e_3$. As a result, two vehicles that are the mobile vehicle A moved to the edge $e_3$ and the originally residing mobile vehicle B exist, and face in the same direction. The moved mobile vehicle A is combined with the originally residing mobile vehicle B at the back in series to form one mobile vehicle A&B (FIG. 8(3)). By moving the mobile vehicle A&B on the edge e3 in FIG. 8(C) such that $v_3 \to e_5$, the mobile vehicle A&B is combined with the mobile vehicle C&D on the edge $e_5$ in the same direction in series to form one mobile vehicle A&B&C&D (FIG. 8(4)). Since the number of mobile vehicles becomes one, the deadlock determiner 126 determines that the target state of mobile vehicles identified from the information received from the travel management device 201 is not a deadlock.

An example of the combining calculator 125 efficiently performing the mobile vehicle combining process is described below.

The main part of the traveling path configuration graph is converted into a directed graph. At this time, the direction of the edge is the direction which the mobile vehicle faces if the mobile vehicle is on the edge, and the direction is bidirectional if no mobile vehicle is on the edge.

Figure 9:
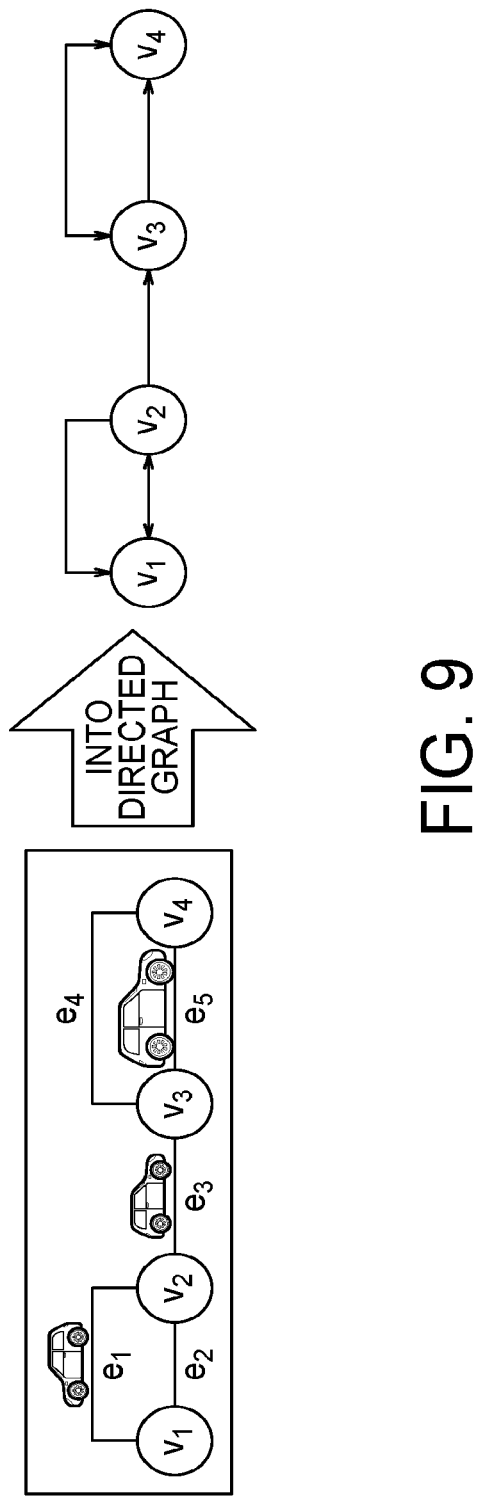
FIG. 9 shows an example of converting a main part of the traveling path configuration graph into a directed graph.

FIG. 9 shows an example of converting the main part of the traveling path configuration graph into a directed graph. The left partial illustration of the diagram shows the main part of the traveling path configuration graph, and mobile vehicles in the main part. No mobile vehicle is on the edge $e_2$ and the edge $e_4$. One mobile vehicle is on each of the edge $e_1$, the edge $e_3$ and the edge $e_5$. The graph part is converted into the directed graph as shown in the right partial illustration of FIG. 9. Since no mobile vehicle is on the edge $e_2$ and edge $e_4$, the directions of the edge $e_2$ and the edge $e_4$ are bidirectional. Since the mobile vehicles are on the edge $e_1$, the edge $e_3$ and the edge $e_5$, the directions of the edge $e_1$, the edge $e_3$ and the edge $e_5$ are the directions which the respective mobile vehicles face.

Any one mobile vehicle is selected in the main part of the traveling path configuration graph. A mobile vehicle to which the selected mobile vehicle can be combined is identified. For example, if the mobile vehicle on the $e_1$ is selected, the mobile vehicle on the edge $e_1$ is toward the vertex $v_1$ and accordingly another vertex reachable from the vertex $v_1$ is searched for from the directed graph. On the directed graph, the vehicle can go forward only in the direction of the edge on which the vehicle exists.

The reachability problem in the directed graph can be achieved by a simple search algorithm. In the case of the directed graph in FIG. 9, vertices $v_2$, $v_3$ and $v_4$ are reachable from the vertex $v_1$. The fact that a mobile vehicle can reach the vertex $v_2$ means that the mobile vehicle can combine to the mobile vehicle on the edge $e_3$ in the same direction. The fact that a mobile vehicle can reach the vertex $v_3$ means that the mobile vehicle can combine to the mobile vehicle on the edge $e_5$ in the same direction. That is, in the case that the mobile vehicle on the edge $e_1$ is moved, the mobile vehicle can be combined with every other mobile vehicle. Consequently, the number of mobile vehicles becomes one, and it can be determined that no deadlock occurs.

In an actual process, in a case where two or more mobile vehicles remain after a certain mobile vehicle is combined with another mobile vehicle, a directed graph is recreated at the time. In the example in FIG. 9, when the mobile vehicle on the edge $e_1$ is moved to the edge $e_3$ and is combined with the mobile vehicle on the edge $e_3$, two or more mobile vehicles remain at this time. Accordingly, a directed graph is recreated, and the processing is continued. As a result, because no mobile vehicle is on the edge $e_1$, the edge $e_1$ is converted into a bidirectional edge (not shown).

Here, the mobile vehicle on the edge $e_1$ is selected first. Accordingly, only by solving the reachability problem once, the number of mobile vehicles can be one (it can be determined that the target state of mobile vehicles is not a deadlock). However, if another mobile vehicle is selected first, two or more mobile vehicles possibly remain as a result of the process. For example, in the case that the mobile vehicle on the edge $e_3$ is selected first and combined with the mobile vehicle on the edge $e_5$, the combined mobile vehicles cannot combine with any mobile vehicle. Accordingly, two mobile vehicles remain. In this case, another mobile vehicle (the mobile vehicle on the edge $e_1$ in this example) is selected, and an analogous process (solving the second reachability problem) is required to be performed. If the number of mobile vehicles finally becomes one, it is determined that no deadlock occurs. If the number of mobile vehicles does not become one even though all the mobile vehicles are targeted for selection, it can be determined that a deadlock occurs.

According to the mobile vehicle combining process described above, the combining of the mobile vehicles is to combine the two mobile vehicles and integrate the vehicles into one. However, the combining process is not limited to integration into one mobile vehicle. According to another example, the mobile vehicles are combined in series to form a mobile vehicle chain including multiple mobile vehicles combined in series (for example, a train or the like including multiple vehicles combined); this is also one mode of combining. In this case, if all the mobile vehicles can be combined in series, it is determined that no deadlock occurs. According to another example of combining, when two mobile vehicles are combined, one of the two vehicle may be removed. Also in this case, if the number of mobile vehicles finally becomes one, it can be determined that no deadlock occurs. A combining method other than that described here may be defined.

Hereinafter, an example of an operation algorithm of the enterable number calculator 123 is specifically described.

As described above, the enterable number calculator 123 determines whether all the mobile vehicles are in a state incapable of going out of the tree structure at the tree structure part (i.e., a deadlock). In a case of not being in this state (i.e., in a case where the tree structure part is not in a deadlock state), the enterable number calculator 123 calculates the number of mobile vehicles to be allowed to enter the tree structure part. That is, the enterable number calculator 123 calculates the number of mobile vehicles allowed to be moved to the tree structure part without bringing the tree structure part into a deadlock.

Figure 10:
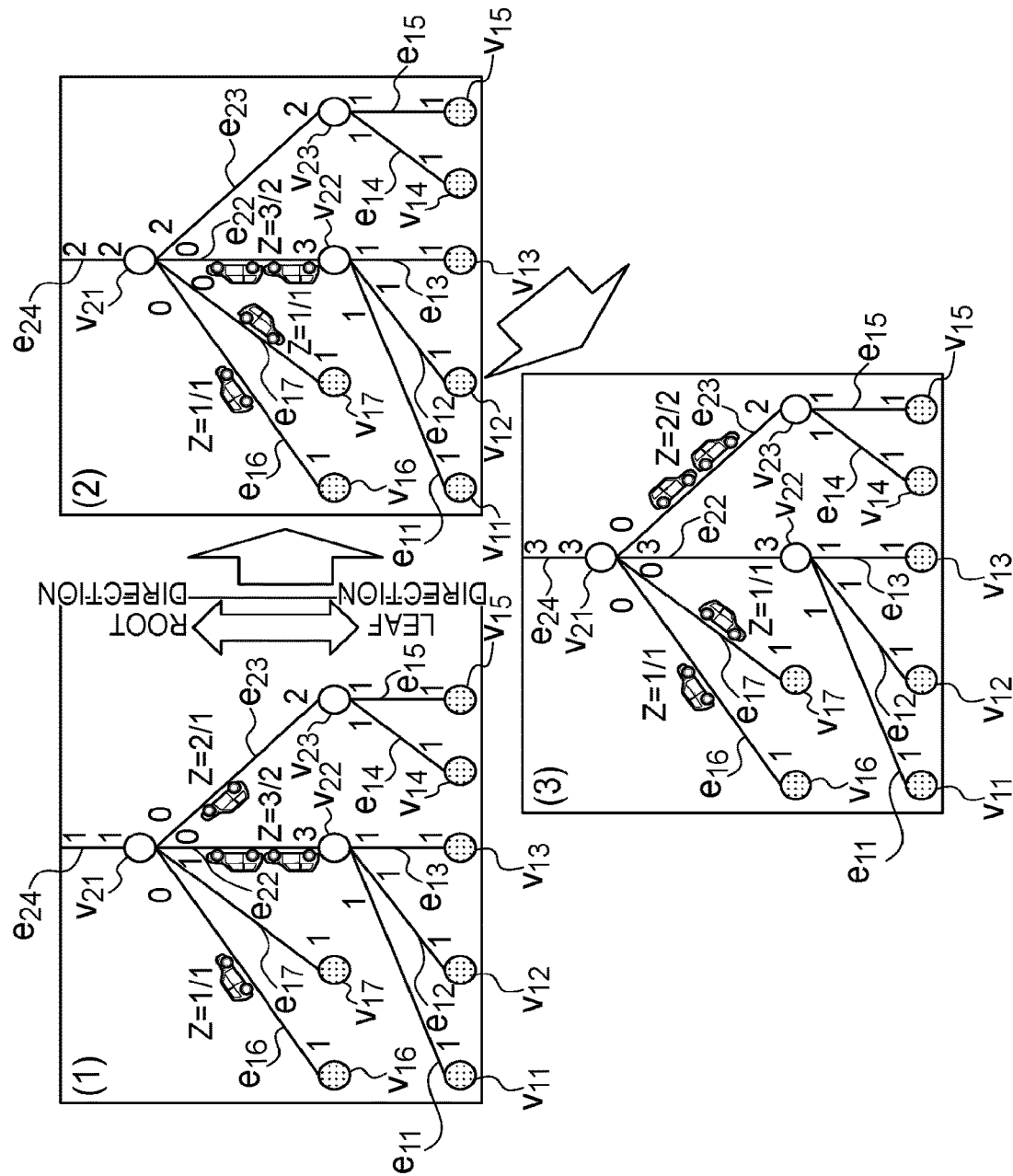
FIG. 10 illustrates an example of an algorithm of the operation of the mobile vehicle mover.

FIG. 10 illustrates this algorithm. A partial illustration (1) of FIG. 10 shows a tree structure part. This tree structure part is an example other than the tree structure part having been described. Blank circles are vertices $v_{21}$ to $v_{23}$ corresponding to intersections. Filled circles are vertices (leaf vertices) $v_1$ to $v_{17}$ corresponding to terminal points. The uppermost vertex $v_{21}$ is a root vertex. The root vertex is linked to the part (main part) other than the tree structure part. Numerals assigned to the both ends of each edge are described later.

[Step 1]

"1" is assigned to the leaf side of every edge linked to a leaf vertex (terminal point) in the tree structure part. The numeral assigned to the leaf side of the edge corresponds to the number of mobile vehicles allowed to enter the vertex on the leaf side.

The partial illustration (1) of FIG. 10 shows a state where "1" is assigned to each leaf side of all the edges $e_{11}$ to $e_{17}$ linked to the leaf vertices $v_{11}$ to $v_{17}$ of the tree structure.

[Step 2]

The edge's root side on every edge assigned a numeral (assumed as "x") on the edge's leaf side is assigned numeral according to the following condition.

(Condition 1) A case where a mobile vehicle toward the root is on the edge: "0" is assigned.

(Condition 2) A case where "n" mobile vehicles toward the leaf are on the edge: "x-n" (i.e., x minus n) is set.

The numeral assigned to the root side of the edge corresponds to the number of mobile vehicles allowed to enter the edge from its root side.

In the partial illustration (1) of FIG. 10, edges assigned numerals on the leaf sides of the edges are the edges $e_{11}$ to $e_{17}$. Numerals based on the condition described above are assigned on the root sides of these edges $e_{11}$ to $e_{17}$. Specifically, a mobile vehicle toward the root is on the edge $e_{16}$. Accordingly, "0" is assigned. On the edges $e_{11}$ to $e_{15}$ and $e_{17}$, no mobile vehicle toward the root exist, and the number of mobile vehicles toward the leaves is "0." Since x=1, "x-0" is calculated to thereby assign "1" on the root sides of the edges $e_{11}$ to $e_{15}$ and $e_{17}$.

[Step 3]

If all the edges from a vertex to the leaf direction are assigned numerals ($y_1, \ldots, y_i, \ldots, y_j$) on the root sides, the leaf side of the edge directed to the root side from the vertex is assigned the sum $\Sigma^j_{i=1} y_i$ of these values. As the result of Step 3, if the numeral are newly assigned on the leaf side of the edge, Step 2 is executed for the edge.

In the partial illustration (1) of FIG. 10, all the edges $e_n$ to $e_{13}$ from the vertex $v_{22}$ in the leaf direction are each assigned a numeral "1" on the root side. Accordingly, the leaf side of the edge e22 directed to the root side from the vertex $v_{22}$ is assigned the sum "3" of these values. Since "3" is newly assigned on the leaf side of the edge $e_{22}$, Step 2 is performed. In Step 2, since a mobile vehicle toward the root is on the edge $e_{22}$, "0" is assigned on the root side of the edge $e_{22}$ according to the condition 1.

All the edges $e_{14}$ and $e_{15}$ from the vertex $v_{23}$ in the leaf direction are each assigned a numeral "1" on the root side. Accordingly, the leaf side of the edge $e_{23}$ directed to the root side from the vertex $v_{23}$ is assigned the sum "2" of these values. Since "2" is newly assigned on the leaf side of the edge $e_{23}$, Step 2 is performed. In Step 2, since a mobile vehicle toward the root is on the edge $e_{23}$, "0" is assigned on the root side of the edge $e_{23}$ according to the condition 1.

All the edges $e_{16}$, $e_{17}$, $e_{22}$ and $e_{23}$ from the vertex $v_{21}$ in the leaf direction are assigned respective numerals "0," "1," "0" and "0" on the root side. Accordingly, the leaf side of the edge $e_{24}$ directed to the root side from the vertex $v_{21}$ is assigned the sum "1" of these values. Since "1" is newly assigned on the leaf side of the edge $e_{24}$, Step 2 is performed. In Step 2, since no mobile vehicle toward the root is on the edge $e_{24}$, "1" is assigned on the root side of the edge $e_{24}$ according to the condition 2.

The processes of Steps 1 to 3 described above assign numerals on the root sides and leaf sides of all the edges. In the partial illustration (1) of FIG. 10, the numerals are assigned on the root sides and leaf sides of all the edges. If there is an edge assigned a negative value at this time, the state is determined as a deadlock. In the example of the drawing, no edge assigned a negative value exist.

In steps thereafter, the number of mobile vehicles that can enter the tree structure part is calculated.

[Step 4]

For every edge where at least one mobile vehicle exist, Z=(the numeral on the leaf side—the numeral on the root side)/the number of mobile vehicles is calculated. "−" denotes subtraction, and "/" denotes division. "Z" corresponds to, for example, an evaluation value (penalty value) that indicates that the loss (waste) of use of the traveling path caused by existence of the mobile vehicle on the edge. For example, it can be determined that the higher the evaluation value is, the larger the loss (waste) is.

In the partial illustration (1) of FIG. 10, edges where mobile vehicles exist are edges $e_{16}$, $e_{22}$ and $e_{23}$. For the edge $e_{16}$, Z=(1-0)/1=1/1=1. For the edge $e_{22}$, Z=(3-0)/2=3/2=1.5. For the edge $e_{23}$, Z=(2-0)/1=2/1=2.

[Step 5]

Among the edges with Z>1, the edge with the minimum number of mobile vehicles is selected. If there are multiple edges with the minimum number of mobile vehicles, the edge having the maximum "Z" thereamong is selected. The selected edge is denoted as "e_select." If there is no edge to be selected (for example, there is no edge with Z>1), the processing proceeds to Step 7.

In the partial illustration (1) in FIG. 10, the edge having the minimum number of mobile vehicles among the edges with Z>1 is the edge $e_{23}$. Consequently, the edge $e_{23}$ is selected. The selected edge $e_{23}$ is denoted as "e_select."

[Step 6]

Every mobile vehicle (denoted as "h") on the edge "e_select" is moved to the edge that satisfies all the following three conditions. If two or more mobile vehicles are on the edge "e_select," the movement destination edges of these mobile vehicles are not necessarily the same.

(Condition α) If the mobile vehicle h is moved, "Z" value calculated for the movement destination edge is "1" (Z=1).

(Condition β) no vehicle can move to (enter) an edge on which another mobile vehicle facing in the direction opposite to the movement direction of the mobile vehicle h exist on the edge.

(Condition γ) The mobile vehicle h can move to an edge (denoted as "f") in a leaf direction different from the leaf direction of the edge on which the mobile vehicle h currently exist, only if the numeral on the root side of the edge f is larger than "0."

If the movement destination edges for all the mobile vehicles on the edge "e_select" are found, the mobile vehicles are moved to the movement destination edges, and the processing returns to Step 2 (the numerals on the edges are reassigned).

If there is at least one mobile vehicle without any movement destination satisfying the conditions among all the mobile vehicles on the edge "e_select," the processing returns to Step 5, and the edges are reselected. Note that edges having already been selected are excluded from the selection candidates.

In the partial illustration (1) in FIG. 10, when the movement destination edge of the mobile vehicle on the edge "e_select" (here, the edge $e_{23}$) is searched for, the edge satisfying the three conditions is only the edge $e_{17}$. Consequently, the mobile vehicle on the edge "e_select" (here, the edge $e_{23}$) is moved to the edge $e_{17}$.

The partial illustration (2) in FIG. 10 shows a state where the mobile vehicle on the edge $e_{23}$ has been moved to the edge $e_{17}$.

After movement to the edge $e_{17}$, the processing returns to Step 2, and the numerals on the edges are reassigned. That is, on the edge $e_{23}$, no mobile vehicle toward the root exists, and the number "n" of mobile vehicles toward the leaves is "0." Since x=2, x-n=2-0=2 is calculated to thereby assign "2" on the root side of the edge $e_{23}$. On the edge $e_{17}$, no mobile vehicle toward the root exists, and the number "n" of mobile vehicles toward the leaves is "1." Since x=1, x-n=1-1=0 is calculated to thereby assign "0" on the root side of the edge e17.

In Step 3 subsequent to Step 2, "2" that is the sum of the numeral "0," "0," "0" and "2" on the root sides of all the edges from the vertex $v_{21}$ toward the leaf direction is calculated, and the calculated "2" is assigned to the leaf side of the edge $e_{24}$ directed to the root side from the vertex $v_{21}$. Since "2" is assigned on the leaf side of the edge $e_{24}$, Step 2 is performed, thus assigning "2" on the root side of the edge $e_{24}$.

In Step 4 subsequent to Step 3, "Z" is calculated for the edge $e_{17}$. For the edge $e_{17}$, Z=(1-0)/1=1/1=1. Since no mobile vehicle is on the edge $e_{23}$, "Z" is not calculated.

The partial illustration (2) in FIG. 10 shows the numerals reassigned to the edges $e_{17}$, $e_{23}$ and $e_{24}$, and the value of "Z" value calculated for the edge $e_{17}$.

In Step 5 subsequent to Step 4, among the edges with Z>1, the edge with the minimum number of mobile vehicles is selected. The edge having the minimum number of mobile vehicles among the edges with Z>1 is the edge $e_{22}$ with Z=3/2. Consequently, the edge $e_{22}$ is selected. The selected edge $e_{22}$ is denoted as "e_select."

In Step 6 subsequent to Step 5, every mobile vehicle (denoted as "h") on the edge "e_select" is moved to the edge that satisfies all the three conditions α, β and γ described above. The edge satisfying these conditions is $e_{23}$. Consequently, every mobile vehicle on the edge "e_select" (here, the edge $e_{22}$) is moved to the edge $e_{23}$.

The partial illustration (3) in FIG. 10 shows a state where all the mobile vehicles on the edge $e_{22}$ have been moved to the edge $e_{23}$.

After movement to the edge $e_{23}$, the processing returns to Step 2, and the numerals on the edges are reassigned. That is, on the edge $e_{22}$, no mobile vehicle toward the root exists, and the number "n" of mobile vehicles toward the leaves is "0." Since x=3, x-n=3-0=3 is calculated to thereby assign "3" on the root side of the edge $e_{22}$. On the edge $e_{23}$, no mobile vehicle toward the root exists, and the number "n" of mobile vehicles toward the leaves is "2." Since x=2, x-n=2-2=0 is calculated to thereby assign "0" on the root side of the edge $e_{23}$.

In Step 3 subsequent to Step 2, "3" that is the sum of the numeral "0," "0," "3" and "0" on the root sides of all the edges from the vertex $v_{21}$ toward the leaf direction is calculated, and the calculated "3" is assigned to the leaf side of the edge $e_{24}$ directed to the root side from the vertex $v_{21}$. Since "3" is assigned on the leaf side of the edge $e_{24}$, Step 2 is performed, thus assigning "3" on the root side of the edge $e_{24}$.

In Step 4 subsequent to Step 3, "Z" is calculated for the edge $e_{23}$. For the edge $e_{23}$, Z=(2-0)/2=2/2=1. Since no mobile vehicle is on the edge $e_{22}$, "Z" is not calculated.

The partial illustration (3) in FIG. 10 shows the numerals reassigned to the edges $e_{22}$, $e_{23}$ and $e_{24}$, and the value of "Z" calculated for the edge $e_{24}$.

In Step 5 subsequent to Step 4, there is no edge with Z>1. Accordingly, it is determined that there is no edge to be selected. The processing proceeds to Step 7.

[Step 7]

In this step, the numerical value assigned to the main part (entrance side) of the edge incident from the part (main part) other than the tree structure part to the root vertex of the tree structure is returned as the enterable number.

In the partial illustration (3) in FIG. 10, the numerical value assigned to the main part side of the edge $e_{24}$ incident from the part (main part) other than the tree structure part to the root vertex $v_{21}$ is "3." Consequently, "3" is determined as the enterable number.

Figure 11:
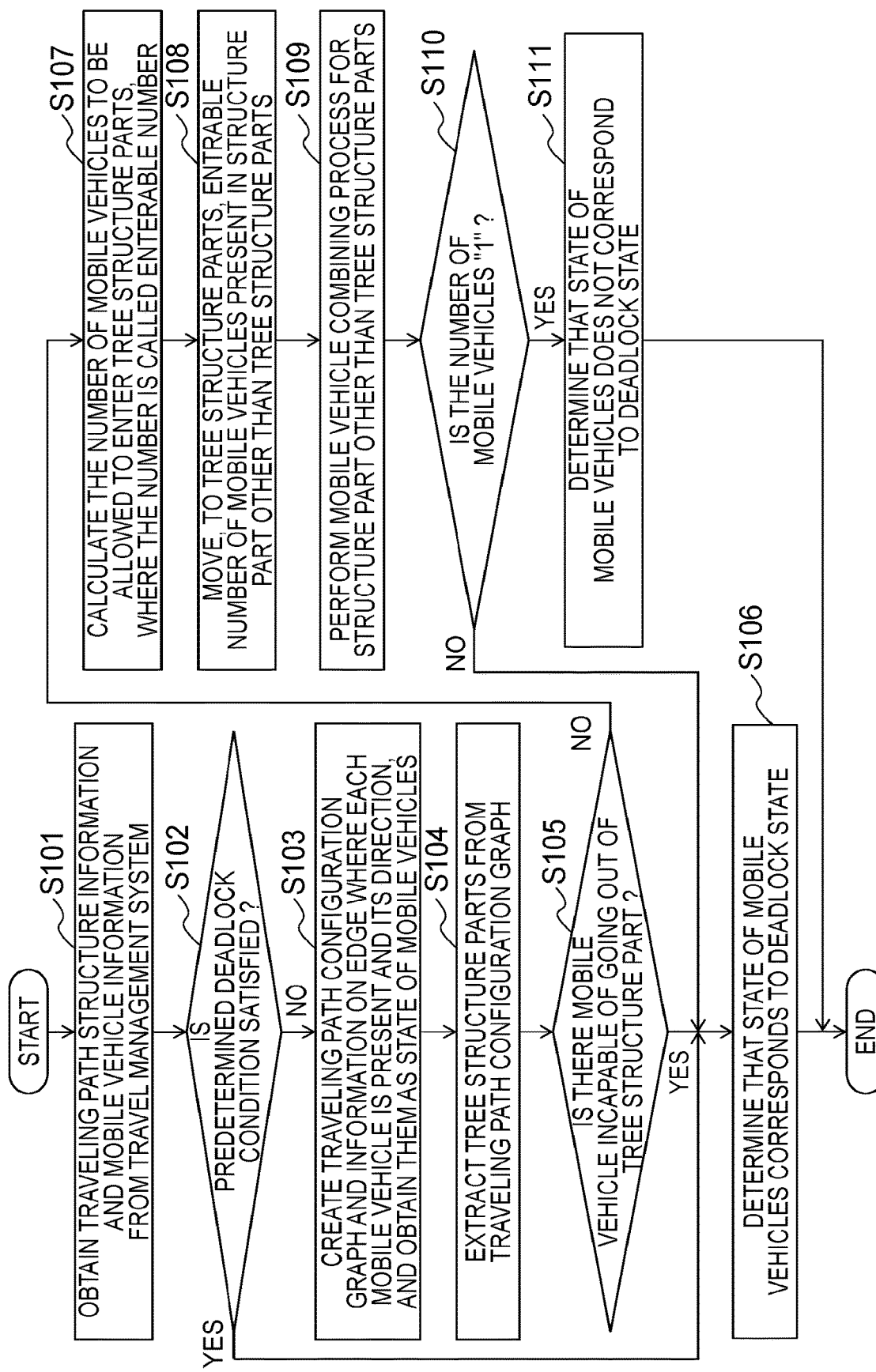
FIG. 11 is a flowchart showing an example of an operation of the deadlock detection device according to the first embodiment.

FIG. 11 is a flowchart showing an example of the operation of the deadlock detection device 101 according to this embodiment.

The state information creator 121 of the deadlock detection device 101 receives the traveling path structure information and the mobile vehicle information (information including the position and direction of the mobile vehicle) from the travel management device 201 (S101). The traveling path structure information and mobile vehicle information are stored in the storage 131.

The state information creator 121 checks whether the predetermined deadlock condition is satisfied on the basis of the received information (S102). The predetermined deadlock condition is a condition under which the obvious deadlock occurs as shown in FIGS. 4A, 4B and 4C described above. If the predetermined deadlock condition is satisfied (YES), that is, if an obvious deadlock occurs, the satisfaction of the predetermined deadlock condition is notified to the deadlock determiner 126. The deadlock determiner 126 determines that a deadlock occurs (S106), and the processing of this flowchart is finished.

If the predetermined deadlock condition is not satisfied (NO), the state information creator 121 creates the traveling path configuration graph on the basis of the traveling path structure information and the mobile vehicle information obtained in step S101 (S103). The state of mobile vehicles (target state of mobile vehicles) is identified on the basis of the traveling path configuration graph and the mobile vehicle information (the same S103). The traveling path configuration graph and information representing the identified state (target state) of mobile vehicles are stored in the storage 131.

The tree structure extractor 122 extracts the tree structure part included in the traveling path configuration graph in the storage 131 (S104).

The enterable number calculator 123 checks whether a mobile vehicle incapable of going out of the tree structure part exists in the extracted tree structure part (S105). If there is a mobile vehicle incapable of going out of the tree structure part (YES), the deadlock determiner 126 determines that the target state of mobile vehicles is a deadlock (S106), and this process is finished.

If the enterable number calculator 123 determines that there is no mobile vehicle incapable of going out of the tree structure part (NO), the enterable number calculator 123 calculates the enterable number that is the number of mobile vehicles to be allowed to additionally enter the tree structure part (S107). That is, the enterable number calculator 123 calculates the number of mobile vehicles that do not cause a deadlock even if the mobile vehicles enter the tree structure part.

The mobile vehicle mover 124 selects one or more mobile vehicles as many as the enterable number calculated by the enterable number calculator 123, from the part other than the tree structure part in the traveling path configuration graph, and moves the selected mobile vehicles to the tree structure part (S108). At this time, if it is possible to select the mobile vehicles so that no mobile vehicle exist from the edge in the main part, the mobile vehicles on the edge is selected, and the selected mobile vehicles are moved to the tree structure part.

The combining calculator 125 removes each tree structure part to which the mobile vehicles have been moved by the mobile vehicle mover 124 from the traveling path configuration graph, and the mobile vehicle combining process is performed based on the traveling path configuration graph (main part) after the removal, and based on the mobile vehicles on the main body part (S109). The mobile vehicle combining process selects a mobile vehicle from among the mobile vehicles in the main part, moves the selected mobile vehicle, and combines the selected mobile vehicle to another mobile vehicle facing the same direction at the back of the other mobile vehicle in series. The multiple mobile vehicles combined in series in the same direction are regarded as one mobile vehicle. Accordingly, the number of mobile vehicles existing in the main part is reduced by one. The combined mobile vehicles or another mobile vehicle is selected, and the selected mobile vehicle is moved and is combined with still another mobile vehicle at the back of the still another mobile vehicle in series in the same manner. Hereinafter, an analogous process is repetitively performed.

If the number of mobile vehicles finally becomes "1" (YES in S110) as a result of the mobile vehicle combining process, the deadlock determiner 126 determines that the target state of mobile vehicles is not a deadlock (S111). On the contrary, if the number of mobile vehicles is two or more (NO in S110), the deadlock determiner 126 determines that the target state of mobile vehicles is a deadlock (S106).

As described above, according to this embodiment, if the number of mobile vehicles becomes "1" as a result of the mobile vehicle combining process, it is determined that no deadlock occurs. Consequently, it can be determined whether a deadlock occurs rapidly. That is, state search by which time is taken is not required to determine whether a deadlock occurs for the state of mobile vehicles.

For example, when the state X1 shown in FIG. 3 is the target state of mobile vehicles, the related arts search the states transitionable from the state X1, for example, the states X2, X3 and X4, and many states to which these states can transition (are branched off). If at least one state that is not an obvious deadlock is found among the states X2, X3 and X4 and the states transitionable from the states X2, X3 and X4, it is determined that the state (X4 in the example of FIG. 3) is not a deadlock. However, this method takes significant time.

On the contrary, according to this embodiment, the state search is not performed, and the mobile vehicle combining process and the like are performed for the target state of mobile vehicles, thereby determining whether a deadlock occurs. Accordingly, whether the deadlock occurs can be determined rapidly. In the case that many states after the state X1 are sequentially searched for along a temporal axis, the states X2 and X3 can be determined as a deadlock rapidly without performing further search after the states X2 and X3 according to the present embodiment even if the states X2 and X3 are not the obvious deadlock. Accordingly, time can be efficiently used to search for the states after the state X4 which has been determined not to be a deadlock according to the present embodiment. Consequently, the traveling plan for achieving the optimal mobile vehicle traveling can be created rapidly. The real-time travel management and control of the mobile vehicles can be effectively performed.

Figure 12:
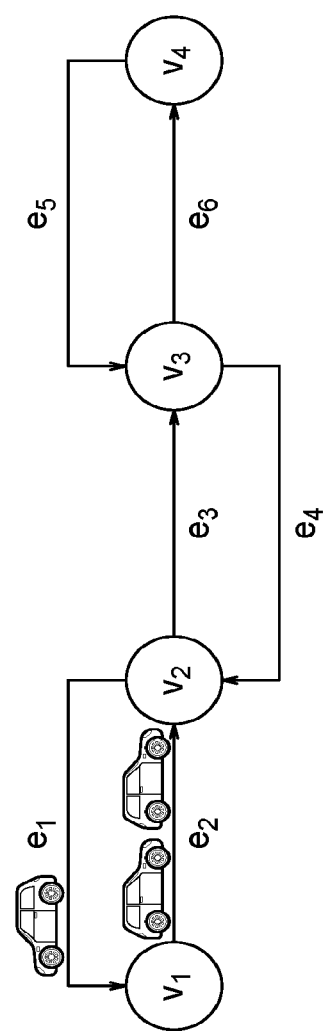
FIG. 12 shows an example where a limitation of a traveling direction is set on each edge of the traveling path configuration graph.

As one method of preventing occurrence of a deadlock, there is known a method of limiting the traveling direction in one direction on each traveling path. FIG. 12 shows an example where a limitation of a traveling direction is set on each traveling path (edge) of the traveling path configuration graph. In this example, the mobile vehicle having arrived at the vertex $v_2$ can travel only to the edge $e_3$. However, according to such limitation of the traveling direction, when the speed of the preceding vehicle is slow, the following mobile vehicle is required to keep the speed slow. As a result, the traveling efficiency reduces. On the contrary, in this embodiment, it can be determined that without any limitation on the traveling direction, no deadlock occurs even if two mobile vehicles on the edge $e_2$ enter the respective edge $e_3$ and $e_4$. Accordingly, in comparison with the method of limiting the traveling direction, an efficient mobile vehicle traveling can be achieved.

In this embodiment, before the mobile vehicle combining process is performed, the mobile vehicle is moved to the tree structure part, and the tree structure part after vehicle movement is removed. However, depending on a structure of the traveling path configuration graph, no tree structure exists in the traveling path configuration graph. In such cases, the processes associated with the tree structure are omitted from the processes of this embodiment. Accordingly, the present embodiment is applicable also to traveling path configuration graph without any tree structure.

Second Embodiment

The first embodiment assumes the case without any upper limit of the number of mobile vehicles allowed to exist on each traveling path (each edge of the traveling path configuration graph). That is, all the mobile vehicles are allowed to exist on the same traveling path (edge) in series at the same time. On the contrary, a second embodiment deals with a case in which an upper limit value of the number of mobile vehicles allowed to exist on the traveling path at the same time is provided. The block diagram of this embodiment is the same as that of FIG. 1. However, the function of the deadlock determiner 126 is partially extended.

The combining calculator 125 performs the mobile vehicle combining process described in the first embodiment. As a result, when the number of mobile vehicles becomes one, the deadlock determiner 126 determines that no deadlock occurs, as with the first embodiment. On the other hand, when two or more mobile vehicles remain as a result of the mobile vehicle combining process, the deadlock determiner 126 performs a process of the second embodiment described below and thereby determines whether a deadlock occurs.

In this embodiment, for each traveling path, the upper limit value of the number of enterable mobile vehicles (allowed to exist at the same time) is set. Information on the upper limit value is obtained as a part of the traveling path structure information from the travel management device 201. The upper limit value of the traveling path having the lowest upper limit value among the traveling paths is regarded as "u." At this time, the number of mobile vehicles allowed to be combined by the combining calculator 125 in the same direction in series on the same traveling path is "u" at the maximum.

Figure 13:
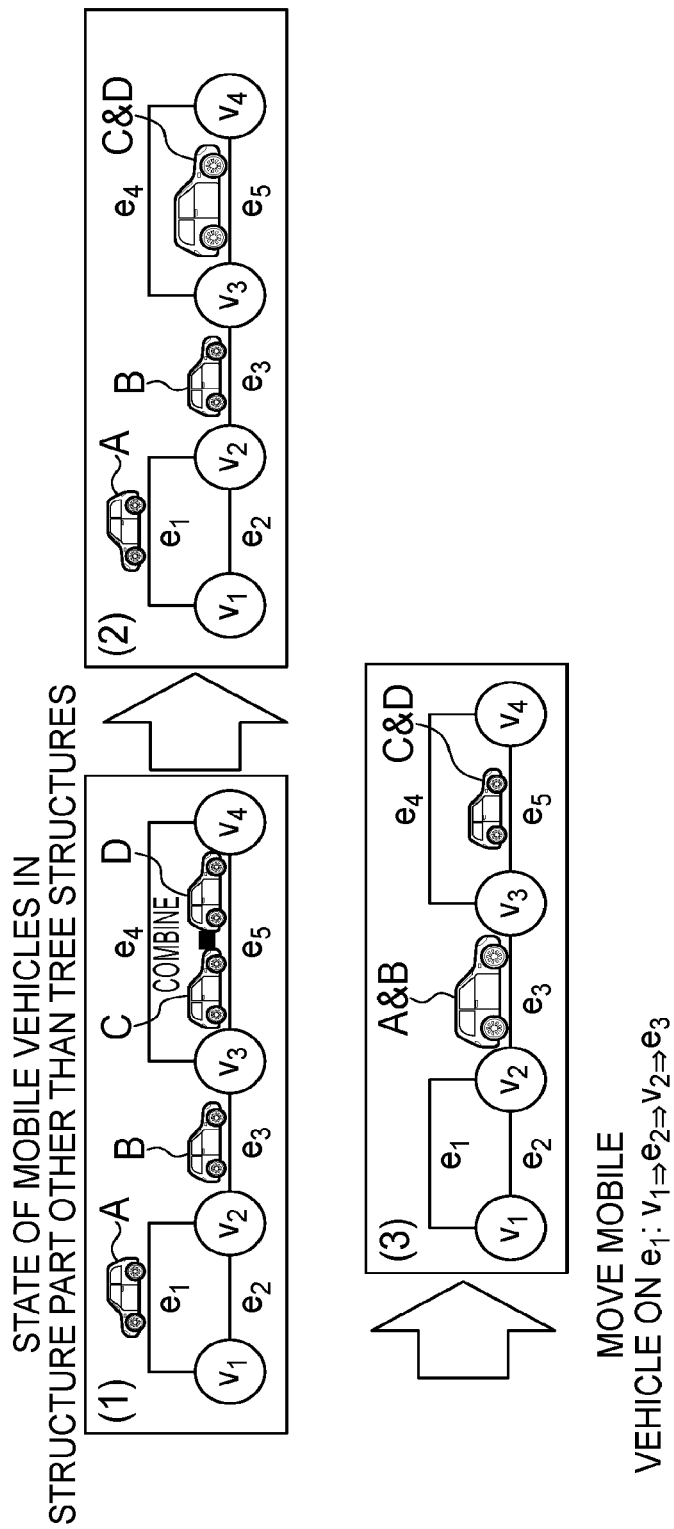
FIG. 13 shows a specific example of a mobile vehicle combining process according to a second embodiment.

FIG. 13 illustrates the process by the combining calculator 125 in a case where the upper limit value of the number of mobile vehicles on the traveling path is u=2. The partial illustrations (1) to (3) are the same as those in FIG. 8. In the first embodiment, the mobile vehicle combining process proceeds to the partial illustration (4). In the second embodiment, since u=2, three or more mobile vehicles cannot exist on the traveling path at the same time. Accordingly, no further combining process can proceed. Accordingly, two mobile vehicles finally remain.

When two or more mobile vehicles remain as a result of the mobile vehicle combining process performed under the limitation by the upper limit value of the number of mobile vehicles allowed to exist on the traveling path at the same time, the deadlock determiner 126 determines whether the remaining mobile vehicles can travel to any intersection or terminal point, by a known method (exhaustive search, simulation or the like). In a case where any mobile vehicle cannot travel to any intersection or terminal point, it is determined that a deadlock occurs. In the other cases, it is determined that no deadlock occurs. Typically, calculation time is required for exhaustive search, simulation or the like. However, in this embodiment, exhaustive search or simulation may be performed in a state where the number of mobile vehicles is reduced by the combining calculator 125 from the original number of mobile vehicles. Accordingly, required calculation time can be reduced.

In the example in FIG. 13, as a result of exhaustive search, simulation or the like, it is determined that each of the mobile vehicle C&D and the mobile vehicle A&B can travel to any intersection or terminal point. Consequently, the deadlock determiner 126 determines that no deadlock occurs.

Figure 14:
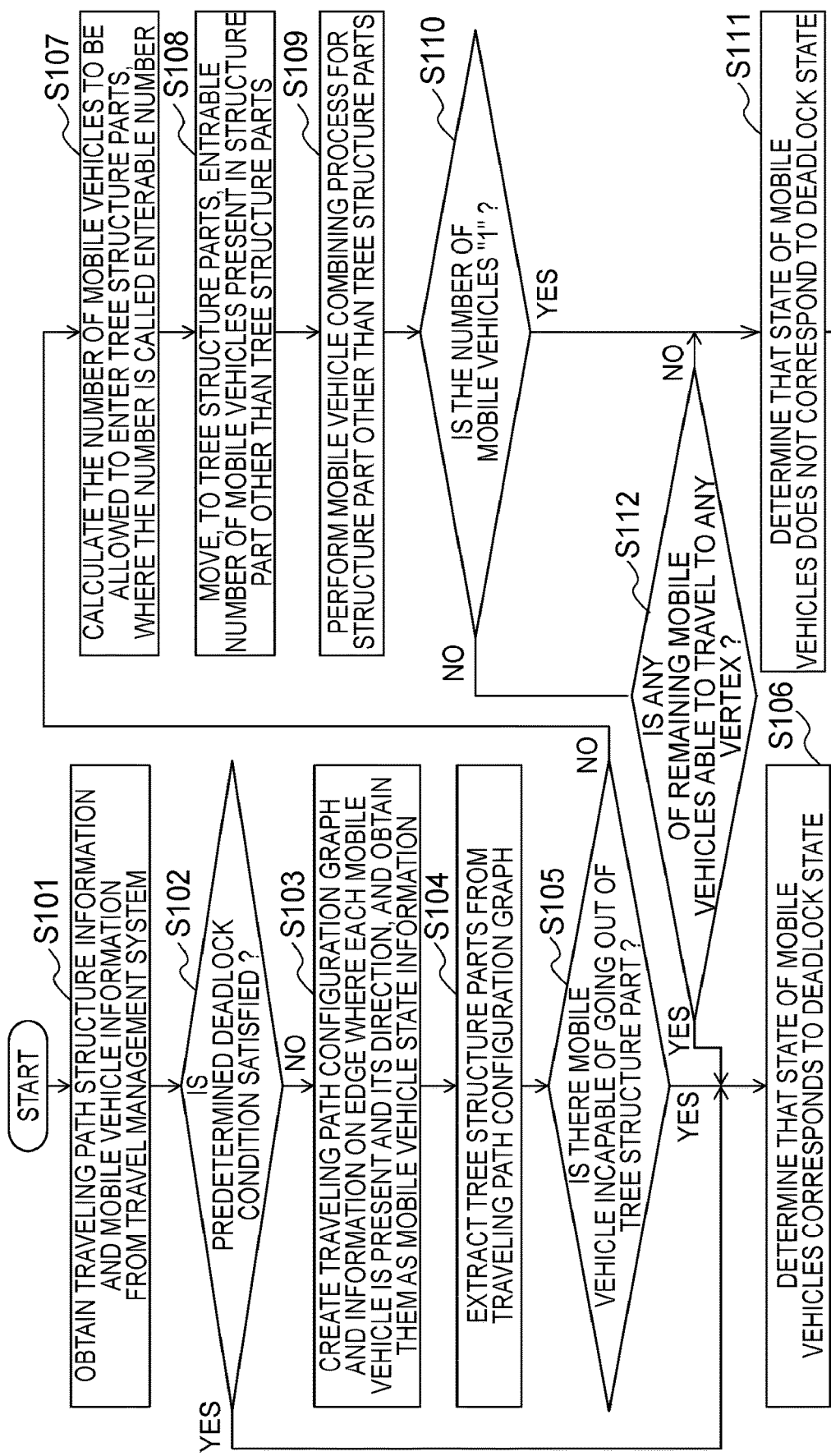
FIG. 14 is a flowchart of an example of an operation according to the second embodiment.

FIG. 14 is a flowchart of an example of the operation according to the second embodiment. The difference from the flowchart of the first embodiment is that step S112 is added. In S112, when two or more mobile vehicles remain as a result of the mobile vehicle combining process, it is determined whether any of the remaining mobile vehicles cannot travel to any vertex (intersection or terminal point). If travel to any vertex is impossible (YES), it is determined that a deadlock occurs (S106). If all the remaining mobile vehicles can travel to any vertex (NO), it is determined that no deadlock occurs (S111).

As described above, according to this embodiment, even in a case that an upper limit of the number of mobile vehicles allowed to exist on each traveling path at the same time, it can be determined whether a deadlock occurs rapidly.

Third Embodiment

Figure 15:
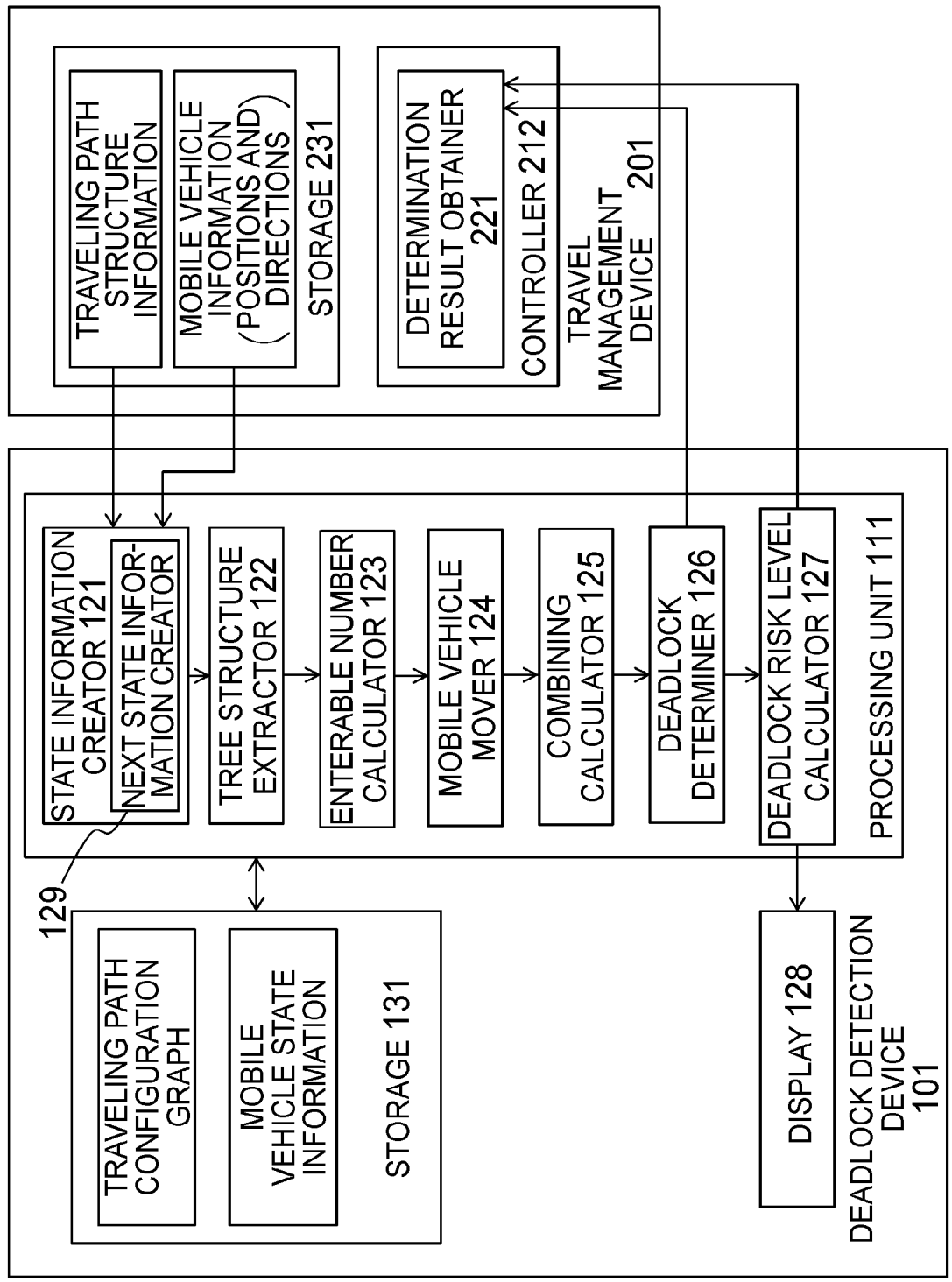
FIG. 15 is a block diagram of a travel management system that includes a deadlock detection device according to a third embodiment, and a travel management device.

FIG. 15 is a block diagram of a travel management system that includes a deadlock detection device 101 according to a third embodiment, and a travel management device 201. The difference from the first embodiment is that a deadlock risk level calculator 127 and a display 128 are added. Furthermore, the state information creator 121 includes a next state information creator 129 that creates a state of mobile vehicles serving as candidates of the next transition destination of the target state of mobile vehicles.

If the deadlock determiner 126 determines that the target state of mobile vehicles is not a deadlock, the deadlock risk level calculator 127 calculates a deadlock risk level (first deadlock risk level) that represents the degree of possibility that the target state of mobile vehicles becomes a deadlock by state transition thereafter. As possibility of a deadlock is larger, the number of movement patterns for preventing the state from being a deadlock is smaller (more limited). Also, the deadlock risk level calculator 127 calculates a deadlock risk level (second deadlock risk level) that represents the degree of possibility that a deadlock occurs when each mobile vehicle moves in the target state of mobile vehicles moves for each mobile vehicle.

The next state information creator 129 creates all the states of mobile vehicles (next states of mobile vehicles) serving as the candidates of the next transition destination of the target state of mobile vehicles. The next state of mobile vehicles corresponds to a state where one mobile vehicle in the target state of mobile vehicles passes the next vertex (terminal point or intersection) once. Consequently, the next states of mobile vehicles as many as the number of edges through which each mobile vehicle can pass at the next vertex (selectable) are identified. The set of the states of mobile vehicles identified for all the mobile vehicles is all the next states of mobile vehicles of the target state of mobile vehicles. Whether a deadlock occurs is determined for each of the next states of mobile vehicles, as with the first or second embodiment. It can be determined whether a deadlock occurs, in a manner analogous to that of the first or second embodiment. Then, the number of next states of mobile vehicles in which a deadlock occurs is calculated.

The deadlock risk level calculator 127 calculates the deadlock risk level (first deadlock risk level) according to the ratio of the number of next states of mobile vehicles in which a deadlock occurs among all the next states of mobile vehicles to the number of all the next states of mobile vehicles. The deadlock risk level calculator 127 calculates the deadlock risk level (second deadlock risk level) of each mobile vehicle according to the ratio of the number of next states of mobile vehicles in which a deadlock occurs among the next states of mobile vehicles identified for each mobile vehicle to the number of next states of mobile vehicles identified for each mobile vehicle. The deadlock risk level may be the value of the ratio, a rank of the value of the ratio, or a representation of another method. The deadlock risk level calculator 127 may identify an edge or edges (traveling path) that cause a deadlock if the mobile vehicle passes through the edge(s) among the edges selectable for each mobile vehicle, and generate information (deadlock traveling path information) representing that a deadlock occurs if the mobile vehicle passes through the traveling path corresponding to the identified edge. Alternatively, the deadlock risk level calculator 127 may generate information (non-deadlock traveling path information) representing that no deadlock occurs if the vehicle passes through a traveling path corresponding to another edge other than the above edge.

The display 128 displays information associated with at least one of the first deadlock risk level and the second deadlock risk level calculated by the deadlock risk level calculator 127. The display 128 displays at least one of the deadlock traveling path information and the non-deadlock traveling path information. The display 128 can be used as a surveillance monitor for an operator of the travel management, for example. In a case where each mobile vehicle is operated by a person, the display 128 may be used as a vehicle-mounted monitor. The information associated with the deadlock risk level may be displayed as colors. For example, the range of possible values of the deadlock risk level may be divided into three (for example, divided into high, middle and low ranges). If the value of the calculated deadlock risk level belongs to the high range, red is displayed. If the value of the calculated deadlock risk level belongs to the middle range, yellow is displayed. If the value of the calculated deadlock risk level belongs to the low range, blue is displayed.

The operator or the driver can know the deadlock risk level (first deadlock risk level) of the target state of mobile vehicles, and the deadlock risk level (second deadlock risk level) of each mobile vehicle, by watching the display 128. The operator or the driver can recognize the movement pattern in which a deadlock does not occur (the direction in which the vehicle travels at the next intersection or terminal point without causing a deadlock) by watching the display 128. When the operator instructs the mobile vehicle to travel, the operator can issue an instruction on the basis of these pieces of information that enables more flexible movement of the mobile vehicle, and achieve more flexible movement of the mobile vehicle. In the case where a driver is in the mobile vehicle, the driver can instruct the traveling direction to avoid a deadlock at the intersection. An example of the display 128 includes a liquid crystal display device, an organic EL display device, a CRT display device, or another type of display device.

Figure 16:
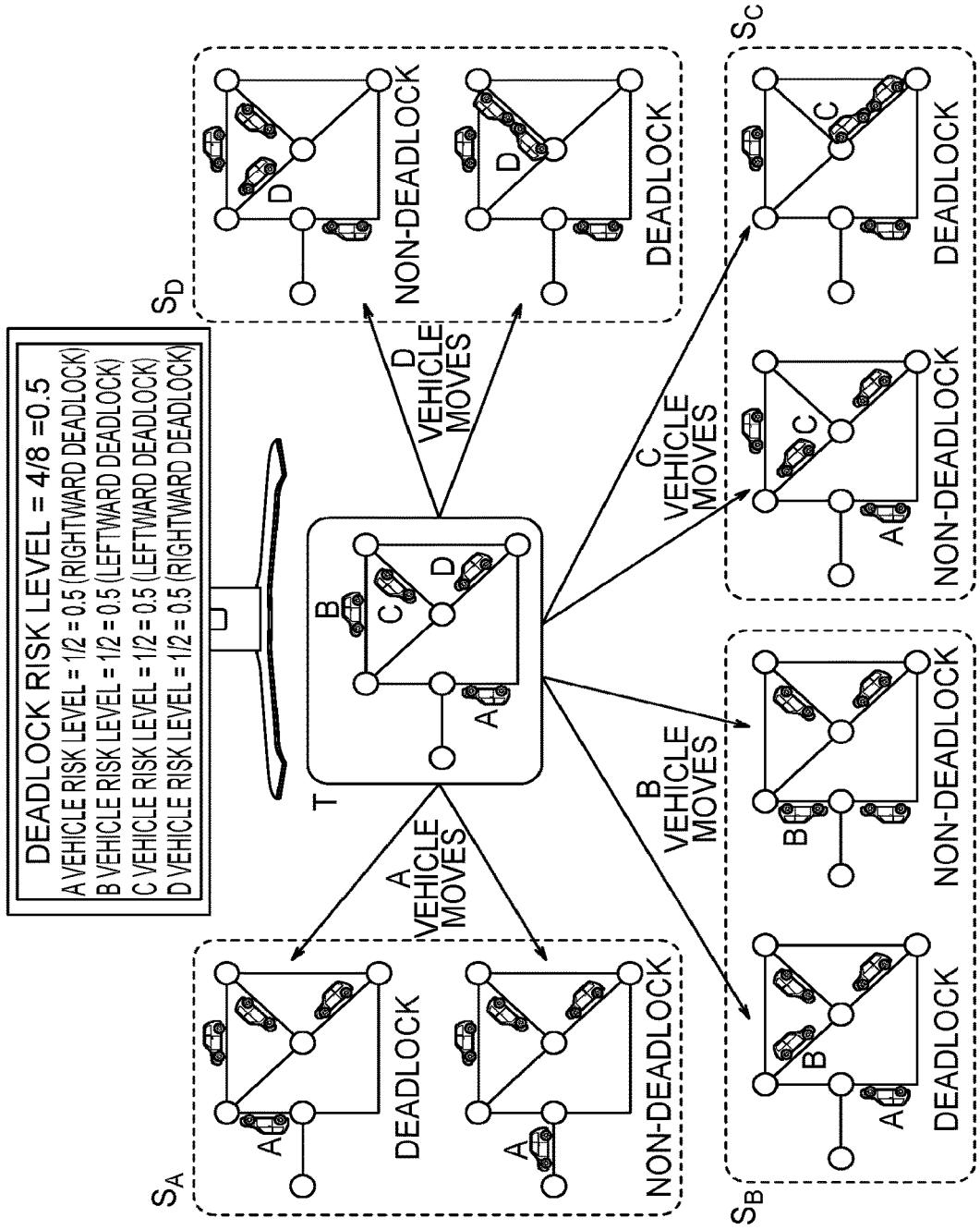
FIG. 16 illustrates a specific example of a process of a deadlock risk level calculator.

FIG. 16 illustrates a specific example of the process of the deadlock risk level calculator 127. The state of mobile vehicles T indicated at the center of the diagram is assumed as the target state of mobile vehicles. In the state of mobile vehicles T, four mobile vehicles are present.

In the state of mobile vehicles T, the mobile vehicle A can select any of two edges (traveling paths) at the next vertex. Accordingly, provided that the set of the next states of mobile vehicles for the mobile vehicle A is "$S_A$," "$S_A$" includes two next states of mobile vehicles. Likewise, the mobile vehicles B, C and D can also select any of two edges at the next vertex. Accordingly, provided that the sets of the next states of mobile vehicles for the mobile vehicles B, C and C are "$S_B$," "$S_C$" and "$S_D$," "$S_B$," "$S_C$" and "$S_D$" each include two next states of mobile vehicles. It is determined that one of the two next states of mobile vehicles in the set "$S_A$" is a deadlock, and the other is not a deadlock. Likewise, it is determined that one of the two states of mobile vehicles for each of the sets "$S_B$," "$S_C$" and "$S_D$" is a deadlock, and the other is not a deadlock. The deadlock risk level calculator 127 identifies, for each mobile vehicle, the edge that causes a deadlock if the mobile vehicle passes through the edge, and the edge that causes no deadlock if the mobile vehicle passes through the edge. The deadlock risk level (second deadlock risk level) for each of the mobile vehicles A to D is calculated by the following Expression (1).

The deadlock risk level for the mobile vehicle
h=(the number of next states of mobile vehicles which causes a deadlock among the next states of mobile vehicles for the mobile vehicle h)/
(the number of next states of mobile vehicles for the mobile vehicle h)  (1)

For example, in a case of the mobile vehicle A, it is assumed that h=A. The number of next states of mobile vehicles for the mobile vehicle A is "2," which is the number of elements of "$S_A$." The number of states of mobile vehicles which causes a deadlock among the two next states of mobile vehicles is "1." Consequently, the deadlock risk level for the mobile vehicle A is ½=0.5. Likewise, also for the mobile vehicles B to D, the deadlock risk level is calculated as "0.5."

The deadlock risk level in the state of mobile vehicles T (first deadlock risk level) is calculated by the following Expression (2).

The deadlock risk level in the state of mobile
vehicles T=(the number of next states of mobile vehicles which causes a deadlock among the number of next states of mobile vehicles for the state of mobile vehicles T)/(the number of next states of mobile vehicles for the state of mobile vehicles T)  (2)

In the example in FIG. 16, since h=A to D, the number of next states of mobile vehicles for the state of mobile vehicles T is $\Sigma|S_h|=|S_A|+|S_B|+|S_C|+|S_D|=2+2+2+2=8$. |S| represents the number of elements of "S." The number of next states of mobile vehicles which causes a deadlock among the eight next states of mobile vehicles is "4." Consequently, the deadlock risk level in the state of mobile vehicles T is ⁴⁄₈=0.5.

An upper part of FIG. 16 shows an example where information of the deadlock risk level for the state of mobile vehicles (first deadlock risk level) and the deadlock risk level for each mobile vehicle (second deadlock risk level) on the surveillance monitor or vehicle-mounted monitor. Information on the edge (traveling path) that causes a deadlock is displayed with respect to each mobile vehicle. "RIGHTWARD DEADLOCK" and "LEFTWARD DEADLOCK" in the diagram correspond to this information. "RIGHTWARD DEADLOCK" means that a deadlock occurs if the mobile vehicle selects the right traveling path at the intersection. "LEFTWARD DEADLOCK" means that a deadlock occurs if the mobile vehicle selects the left traveling path at the intersection. Such information can be used not only for the travel management of mobile vehicles used in a warehouse or the like, but also for a management system that manages running of trains on a railroad, and controls traffic of vehicles and aircraft on roads and in parking facilities and airports.

Figure 17:
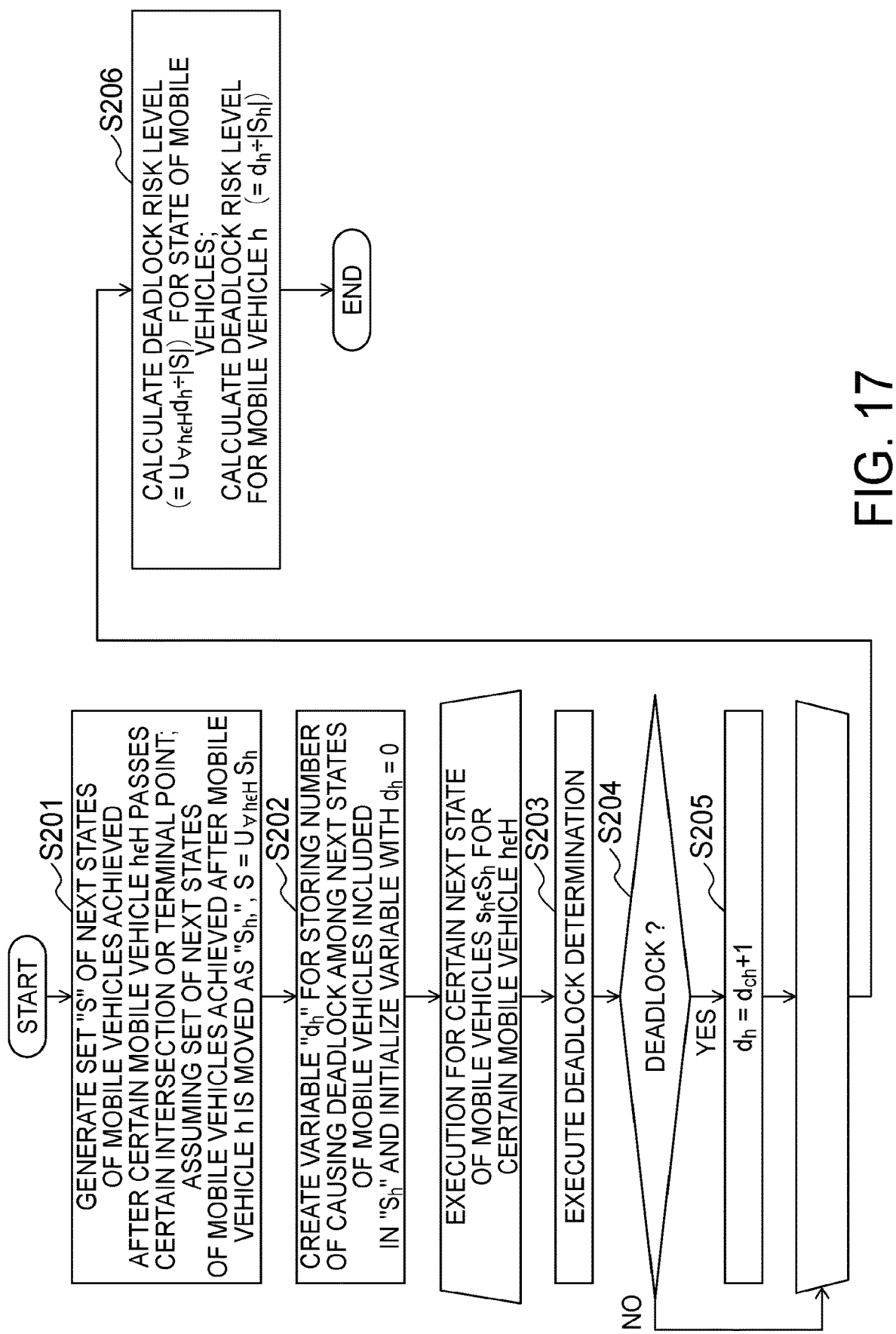
FIG. 17 is a flowchart of an example of a process of calculating the deadlock risk level according to the third embodiment.

FIG. 17 is a flowchart of an example of a process of calculating the deadlock risk level according to the third embodiment.

The next state information creator 129 generates a set "S" of the next states of mobile vehicles by causing a certain mobile vehicle h∈H in the target states of mobile vehicles to pass through a certain intersection or terminal point (i.e., the next vertex) (S201). The set of the next states of mobile vehicles obtained by moving the mobile vehicle h is assumed as "$S_h$."

$$S = U_{\forall h \in H} S_h \qquad [\text{Expression 1}]$$

A variable "$d_h$" for storing the number of next states of mobile vehicles which causes deadlock among the next states of mobile vehicles included in "$S_h$" is created and initialized with $d_h=0$ (S202).

For a certain next state of mobile vehicles $s_h \in S_h$ for a certain mobile vehicle $h \in H$, the following is executed. First, it is determined whether the next state of mobile vehicles "$s_h$" is a deadlock (S204). This process is analogous to the process determining whether the target next state of mobile vehicles is a deadlock in the first or second embodiment. If the next state of mobile vehicles "$s_h$" is determined to be a deadlock, "1" is added to the variable "$d_h$." If the next state of mobile vehicles "$s_h$" is determined not to be a deadlock, the next, next state of mobile vehicles "$s_h$" is selected, and an analogous process is performed (S203, S204 and S205).

The deadlock risk level of the target state of mobile vehicles (first deadlock risk level) is calculated by $$U_{\forall h \in H} d_h \pm |S| \quad (3) \text{ [Expression 2]}$$

(S206).

Expression (3) corresponds to Expression (2) described above.

The deadlock risk level for the mobile vehicle h (second deadlock risk level) is calculated by $$d_h \pm |S_h| \quad \text{Expression (4)[Expression 3]}$$

(the same S206).

Expression (4) corresponds to Expression (1) described above.

In the embodiments described above, the deadlock detection process (FIG. 11) according to the embodiments is used to determine a deadlock for the state of mobile vehicles and the next state of mobile vehicles. Alternatively, the state search may be performed for the state of mobile vehicles and the next state of mobile vehicles on the basis of the predetermined deadlock condition (S102 in FIG. 11) (i.e., in this case, the tree structure extraction process, the mobile vehicle combining process, and the like are not performed). Also in this case, the deadlock risk level calculator 127 may calculate the deadlock risk level (the first deadlock risk level or the second deadlock risk level, or both of them) according to a manner analogous to that described above, and display the calculated level on the display 128. The deadlock traveling path information and the non-deadlock traveling path information may be generated according to a manner analogous to that described above, and be displayed on the display 128. In this case, without creation of the traveling path configuration graph, the state of mobile vehicles representing the position on the traveling path and the direction of each mobile vehicle may be generated using the traveling path structure information and the mobile vehicle information provided from the travel management device 201, and the next state of mobile vehicles subsequent to the state of mobile vehicles may be further generated. The state search may then be performed on the basis of the state of mobile vehicles and the next state of mobile vehicles generated as described above, and the deadlock determination of the state of mobile vehicles and the next state of mobile vehicles may be performed on the basis of the predetermined deadlock condition.

Figure 18:
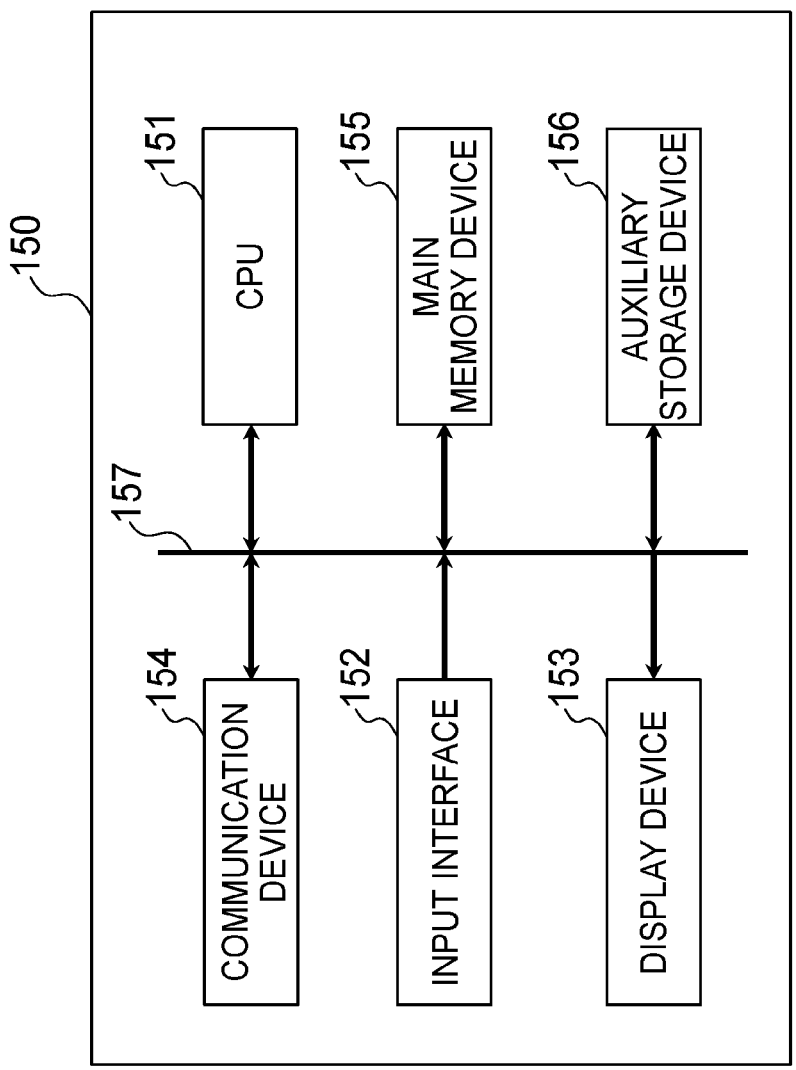
FIG. 18 is a hardware block diagram of the deadlock detection device according to any of the first to third embodiments.

FIG. 18 illustrates a hardware configuration of the deadlock detection device 101 according to any one of the first to third embodiments. The information processing apparatus 101 according to the present embodiment is configured with a computer device 100. The computer device 100 includes a CPU 151, an input interface 152, a display device 153, a communication device 154, a main storage device 155 and an external storage device 156, and these are connected to each other with a bus 157.

The CPU (Central Processing Unit) 151 executes a computer program which realizes the above-described respective functional configurations of the deadlock detection device 101 on the main storage device 155. By the CPU 151 executing the computer program, the respective functional configurations are realized.

The input interface 152 is a circuit for inputting an operation signal from the input device such as a keyboard, a mouse and a touch panel, to the deadlock detection device 101.

The display device 153 displays data or information output from the deadlock detection device 101. While the display device 153 is, for example, an LCD (Liquid Crystal Display), a CRT (Cathode-Ray Tube), and a PDP (Plasma Display Panel), the display device 153 is not limited to this. The data or the information output from the computer device 100 can be displayed by this display device 153.

The communication device 154 is a circuit for the deadlock detection device 101 to communicate with an external device in a wireless or wired manner. Information can be input from the external device via the communication device 154. Information input from the external device can be stored in a DB. A constitution for performing communication in the deadlock detection device can be constructed on the communication device 154.

The main storage device 155 stores a program which realizes processing of the present embodiment, data required for execution of the program, data generated by execution of the program, and the like. The program is developed and executed on the main storage device 155. While the main storage device 155 is, for example, a RAM, a DRAM and an SRAM, the main storage device 155 is not limited to this. The storage in each embodiment may be constructed on the main storage device 155.

The external storage device 156 stores the above-described program, data required for execution of the program, data generated by execution of the program, and the like. These kinds of program and data are read out to the main storage device 155 upon processing of the present embodiment. While the external storage device 156 is, for example, a hard disk, an optical disk, a flash memory and a magnetic tape, the external storage device 156 is not limited to this. The storage in each embodiment may be constructed on the external storage device 156.

Note that the above-described program may be installed in the computer device 100 in advance or may be stored in a storage medium such as a CD-ROM. Further, the program may be uploaded on the Internet.

Note that the computer device 100 may include one or a plurality of the processors 151, the input interfaces 152, the display devices 153, the communication devices 154 and the main storage devices 155, or peripheral equipment such as a printer and a scanner may be connected to the computer device 100.

Further, the deadlock detection device 101 may be configured with a single computer device 100 or may be configured as a system including a plurality of computer devices 100 which are connected to each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device, comprising:
   a hardware storage configured to store a traveling path configuration graph including a plurality of edges representing traveling paths and a plurality of vertices representing intersections connecting the traveling paths, and mobile vehicles being allowed to move in a traveling area including the traveling paths and the intersections but being not allowed to pass each other in the traveling paths; and processing circuitry configured to perform
acquiring a plurality of first state information each including a state of the mobile vehicles at a first timing in the traveling area, the state including positions and directions of the mobile vehicles, the acquired state of the mobile vehicles being associated with the traveling path configuration graph,
selecting a mobile vehicle or combined mobile vehicles from among the mobile vehicles based on each of the first state information,
going forward the selected mobile vehicle or the selected combined mobile vehicles along the edges of the traveling path configuration graph under a rule that the mobile vehicles are not allowed to pass each other in the edges,
combining the selected mobile vehicle or the selected combined mobile vehicles to another mobile vehicle or another combined mobile vehicles at a back of the other mobile vehicle or the other combined mobile vehicles on the traveling path configuration path,
iterating a process of the selecting, the going and combining,
determining that a deadlock occurs if not all the mobile vehicles have been combined on the traveling path configuration path,
determining that no deadlock occurs if all the mobile vehicles have been combined on the traveling path configuration path, wherein the deadlock is a state in which at least one mobile vehicle unable to go forward to any intersection exists,
creating a plurality of second state information indicating a plurality of next states of mobile vehicles transitionable from the state of mobile vehicles in the first state information if the deadlock is determined to not occur among the plurality of first state information,
iterating the process of the selecting, the going and the combining for each of the second state information to determine whether the deadlock occurs, and
not creating the second state information indicating a plurality of next states of mobile vehicles transitionable from the state of mobile vehicles in the first state information if the deadlock is determined to occur among the plurality of first state information,
wherein the plurality of mobile vehicles are operated under a traveling plan created based on the first state information for which the deadlock is determined to not occur and the second state information for which the deadlock is determined to not occur.

2. The information processing device according to claim 1, wherein
the processing circuitry is configured to
receive structure information of a traveling area including the traveling paths and the intersections, and mobile vehicle information representing the positions and the directions of the mobile vehicles in the traveling area, and
create the traveling path configuration graph and the first mobile vehicle state information, based on the structure information and the mobile vehicle information.

3. The information processing device according to claim 2,
wherein the processing circuitry checks whether a deadlock condition is satisfied, based on the structure information of the traveling area and the mobile vehicle information,
wherein the deadlock condition includes least one of:
mobile vehicles facing each other on an identical traveling path;
mobile vehicles existing toward one intersection on all of traveling paths coupled to the one intersection; and
two or more mobile vehicles existing on the traveling path coupled to the terminal point, and
the processing circuitry determines that the deadlock occurs if the deadlock condition is satisfied.

4. The information processing device according to claim 1,
wherein a terminal point is disposed at one end of both ends of the traveling path and the one end is not coupled to the intersection,
the vertices in the traveling path configuration graph represent the intersections and the terminal point, and
the deadlock indicates that any mobile vehicle is incapable of going forward to the intersection or the terminal point.

5. The information processing device according to claim 1, wherein the processing circuitry is configured to:
check whether a tree structure is in the traveling path configuration graph, and to extract tree structure part of the traveling path configuration graph when the tree structure is present;
calculate an enterable number that represents a number of mobile vehicles that do not cause the deadlock even if these mobile vehicles enter the tree structure part from a main part of the traveling path configuration graph, the main part being other than the tree structure part; and
move the mobile vehicles existing in the main part, to the tree structure part, a number of the moved mobile vehicles being as many as the enterable number.

6. The information processing device according to claim 5,
wherein the processing circuitry determines whether a mobile vehicle incapable of going out of the tree structure part exists if at least one mobile vehicle exists in the tree structure part, and
wherein the processing circuitry determines that the deadlock occurs if the mobile vehicle incapable of going out of the tree structure part exists.

7. The information processing device according to claim 5, wherein the processing circuitry selects the mobile vehicle to be moved to the tree structure part such that no mobile vehicle exists from at least one edge of the edges on which the mobile vehicles exist in the main part of the traveling path configuration graph.

8. The information processing device according to claim 1,
wherein an upper limit value of a number of mobile vehicles is set for each of the edges,
the processing circuitry performs the process under a constraint condition that the number of mobile vehicles to be combined on the edge is equal to or less than the upper limit value of the edge,
the processing circuitry determines whether the mobile vehicle or the combined mobile vehicles remaining in the traveling path configuration graph cannot go forward to any intersection by state search, if not all the mobile vehicles is combined, and
the processing circuitry determines that the deadlock occurs if the combining calculator determines that the mobile vehicle or the combined mobile vehicles cannot go forward to the certain intersection.

9. The information processing device according to claim 1, wherein the processing circuitry configured to:
  create a plurality of second state information indicating a plurality of next states of mobile vehicles transitionable from the state of mobile vehicles; and
  determine whether the deadlock occurs in each of the plurality of next states of mobile vehicles,
  calculate a first deadlock risk level for the state of mobile vehicles, based on a number of next states of mobile vehicles in which the deadlock occurs among the plurality of next states of mobile vehicles.

10. The information processing device according to claim 1, wherein:
  the processing circuitry is configured to create a plurality of second state information indicating a plurality of next states of mobile vehicles transitionable from the state of mobile vehicles wherein the mobile vehicle is caused to pass to each of edges selectable at the next vertex by the mobile vehicle to generate the plurality of next states of mobile vehicles; and
  determine whether the deadlock occurs in each of the plurality of next states of mobile vehicles,
  calculate a second deadlock risk level for the mobile vehicle, based on a ratio between a number of next states of mobile vehicles in which the deadlock occurs among the plurality of next states of mobile vehicles, and the number of the plurality of next states of mobile vehicles.

11. The information processing device according to claim 10,
  wherein the processing circuitry
    identifies the edge where the deadlock occurs if the mobile vehicle passes through the edge among the edges selectable by the mobile vehicle at the next vertex, and
    generates information representing that the deadlock occurs if the mobile vehicle passes the traveling path corresponding to the identified edge, or that the deadlock does not occur if the mobile vehicle passes the traveling path corresponding to an edge other than the identified edge.

12. A deadlock detection method, comprising:
  storing, in a hardware storage, a traveling path configuration graph including a plurality of edges representing traveling paths and a plurality of vertices representing intersections connecting the traveling paths, and mobile vehicles being allowed to move in a traveling area including the traveling paths and the intersections but being not allowed to pass each other in the traveling paths;
  acquiring a plurality of first state information each including a state of the mobile vehicles at a first timing in the traveling area, the state including positions and directions of the mobile vehicles, the acquired state of the mobile vehicles being associated with the traveling path configuration graph;
  selecting a mobile vehicle or combined mobile vehicles from among the mobile vehicles based on each of the first state information;
  going forward the selected mobile vehicle or the selected combined mobile vehicles along the edges of the traveling path configuration graph under a rule that the mobile vehicles are not allowed to pass each other in the edges;
  combining the selected mobile vehicle or the selected combined mobile vehicles to another mobile vehicle or another combined mobile vehicles at a back of the other mobile vehicle or the other combined mobile vehicles on the traveling path configuration path;
  iterating a process of the selecting, the going and combining;
  determining that a deadlock occurs if not all the mobile vehicles have been combined on the traveling path configuration path;
  determining that no deadlock occurs if all the mobile vehicles have been combined on the traveling path configuration path, wherein the deadlock is a state in which at least one mobile vehicle unable to go forward to any intersection exists;
  creating a plurality of second state information indicating a plurality of next states of mobile vehicles transitionable from the state of mobile vehicles in the first state information if the deadlock is determined to not occur among the plurality of first state information;
  iterating the process of the selecting, the going and the combining for each of the second state information to determine whether the deadlock occurs;
  not creating the second state information indicating a plurality of next states of mobile vehicles transitionable from the state of mobile vehicles in the first state information if the deadlock is determined to occur among the plurality of first state information; and
  operating the plurality of mobile vehicles under a traveling plan created based on the first state information for which the deadlock is determined to not occur and the second state information for which the deadlock is determined to not occur.

13. A non-transitory computer readable medium having a computer program stored therein which when executed by a computer, causes the computer to perform processes comprising:
  reading out, from a hardware storage, a traveling path configuration graph including a plurality of edges representing traveling paths and a plurality of vertices representing intersections connecting the traveling paths, and mobile vehicles being allowed to move in a traveling area including the traveling paths and the intersections but being not allowed to pass each other in the traveling paths;
  acquiring a plurality of first state information each including a state of the mobile vehicles at a first timing in the traveling area, the state including positions and directions of the mobile vehicles, the acquired state of the mobile vehicles being associated with the traveling path configuration graph;
  selecting a mobile vehicle or combined mobile vehicles from among the mobile vehicles based on each of the first state information;
  going forward the selected mobile vehicle or the selected combined mobile vehicles along the edges of the traveling path configuration graph under a rule that the mobile vehicles are not allowed to pass each other in the edges;
  combining the selected mobile vehicle or the selected combined mobile vehicles to another mobile vehicle or another combined mobile vehicles at a back of the other mobile vehicle or the other combined mobile vehicles on the traveling path configuration path;
  iterating a process of the selecting, the going and combining;
  determining that a deadlock occurs if not all the mobile vehicles have been combined on the traveling path configuration path;

determining that no deadlock occurs if all the mobile vehicles have been combined on the traveling path configuration path, wherein the deadlock is a state in which at least one mobile vehicle unable to go forward to any intersection exists;

creating a plurality of second state information indicating a plurality of next states of mobile vehicles transitionable from the state of mobile vehicles in the first state information if the deadlock is determined to not occur among the plurality of first state information;

iterating the process of the selecting, the going and the combining for each of the second state information to determine whether the deadlock occurs;

not creating the second state information indicating a plurality of next states of mobile vehicles transitionable from the state of mobile vehicles in the first state information if the deadlock is determined to occur among the plurality of first state information; and operating the plurality of mobile vehicles under a traveling plan created based on the first state information for which the deadlock is determined to not occur and the second state information for which the deadlock is determined to not occur.

* * * * *